(12) United States Patent
Makimoto

(10) Patent No.: US 12,061,292 B2
(45) Date of Patent: Aug. 13, 2024

(54) LIGHT RECEIVING APPARATUS AND DISTANCE MEASURING APPARATUS

(71) Applicant: Sony Semiconductor Solutions Corporation, Kanagawa (JP)

(72) Inventor: Kenta Makimoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 912 days.

(21) Appl. No.: 17/251,920

(22) PCT Filed: Jul. 17, 2019

(86) PCT No.: PCT/JP2019/028059
§ 371 (c)(1),
(2) Date: Dec. 14, 2020

(87) PCT Pub. No.: WO2020/022137
PCT Pub. Date: Jan. 30, 2020

(65) Prior Publication Data
US 2021/0165084 A1    Jun. 3, 2021

(30) Foreign Application Priority Data
Jul. 27, 2018  (JP) ................................ 2018-141167

(51) Int. Cl.
*G01S 7/48*       (2006.01)
*G01S 7/4863*    (2020.01)
(Continued)

(52) U.S. Cl.
CPC .......... *G01S 7/4863* (2013.01); *G01S 7/4865* (2013.01); *G01S 7/497* (2013.01)

(58) Field of Classification Search
USPC ....................................................... 356/4.01
See application file for complete search history.

(56) References Cited

U.S. PATENT DOCUMENTS 7,301,608 B1 * 11/2007 Mendenhall ............ G01S 17/18
356/4.1
9,784,679 B2 * 10/2017 Rothberg ........... G01N 21/6408
(Continued)

FOREIGN PATENT DOCUMENTS

| CN | 104567902 A | 4/2015 |
|---|---|---|
| CN | 104730536 A | 6/2015 |

(Continued)

OTHER PUBLICATIONS

European Search Opinion for EP Application 19840492 (6 pages) (Year: 2021).*

(Continued)

*Primary Examiner* — James R Hulka
(74) *Attorney, Agent, or Firm* — Michael Best & Friedrich LLP

(57) ABSTRACT

In one example, a light receiving apparatus includes a light receiving section with pixels arranged in a two-dimensional shape. A signal line is connected to each of the pixels. A time measuring section connected to the signal line measures a time from a light emission instruction timing to a light reception timing, a histogram creating section creates a histogram of the measured value, a storage section stores correction values corresponding to positions of the pixels, a correction processing section executes correction processing on the histogram on the basis of the stored correction values, and an output section outputs a signal subjected to the correction processing. The light receiving apparatus may, for example, be used in a distance measuring apparatus.

20 Claims, 16 Drawing Sheets

(51) Int. Cl.
*G01S 7/4865* (2020.01)
*G01S 7/497* (2006.01)

(56) References Cited

U.S. PATENT DOCUMENTS

| | | | |
|---|---|---|---|
| 10,620,301 B2* | 4/2020 | Wilton .................. | G01S 7/4865 |
| 2009/0185159 A1* | 7/2009 | Rohner .................. | G01S 7/487 |
| | | | 356/5.01 |
| 2013/0300838 A1* | 11/2013 | Borowski ............. | G01S 7/4863 |
| | | | 348/46 |
| 2015/0041625 A1 | 2/2015 | Dutton | |
| 2015/0177369 A1* | 6/2015 | Kostamovaara ......... | G01C 3/08 |
| | | | 250/214.1 |
| 2015/0180581 A1* | 6/2015 | Steiner .................... | G01S 17/87 |
| | | | 398/188 |
| 2018/0074196 A1 | 3/2018 | Weinberg | |

FOREIGN PATENT DOCUMENTS

| CN | 107607960 A | | 1/2018 | |
|---|---|---|---|---|
| EP | 2395369 A1 | | 12/2011 | |
| JP | 2013-225909 A | | 10/2013 | |
| JP | 2015127663 A | | 7/2015 | |
| JP | 2016151458 A | * | 8/2016 | |
| JP | 2016161438 A | * | 9/2016 | |
| JP | 2016-176750 A | | 10/2016 | |
| JP | 2016-211881 A | | 12/2016 | |
| JP | 2016219622 A | | 12/2016 | |
| WO | WO-2015119243 A1 | | 8/2015 | |
| WO | WO-2020166349 A1 | * | 8/2020 | ............. G01S 17/10 |

OTHER PUBLICATIONS

International Search Report, International Application No. PCT/JP2019/028059, dated Oct. 8, 2019.
Notification of Transmittal of the International Search Report and the Written Opinion of the International Searching Authority, or the Declaration (PCT/ISA/220), International Application No. PCT/JP2019/028059, dated Oct. 21, 2019.

* cited by examiner

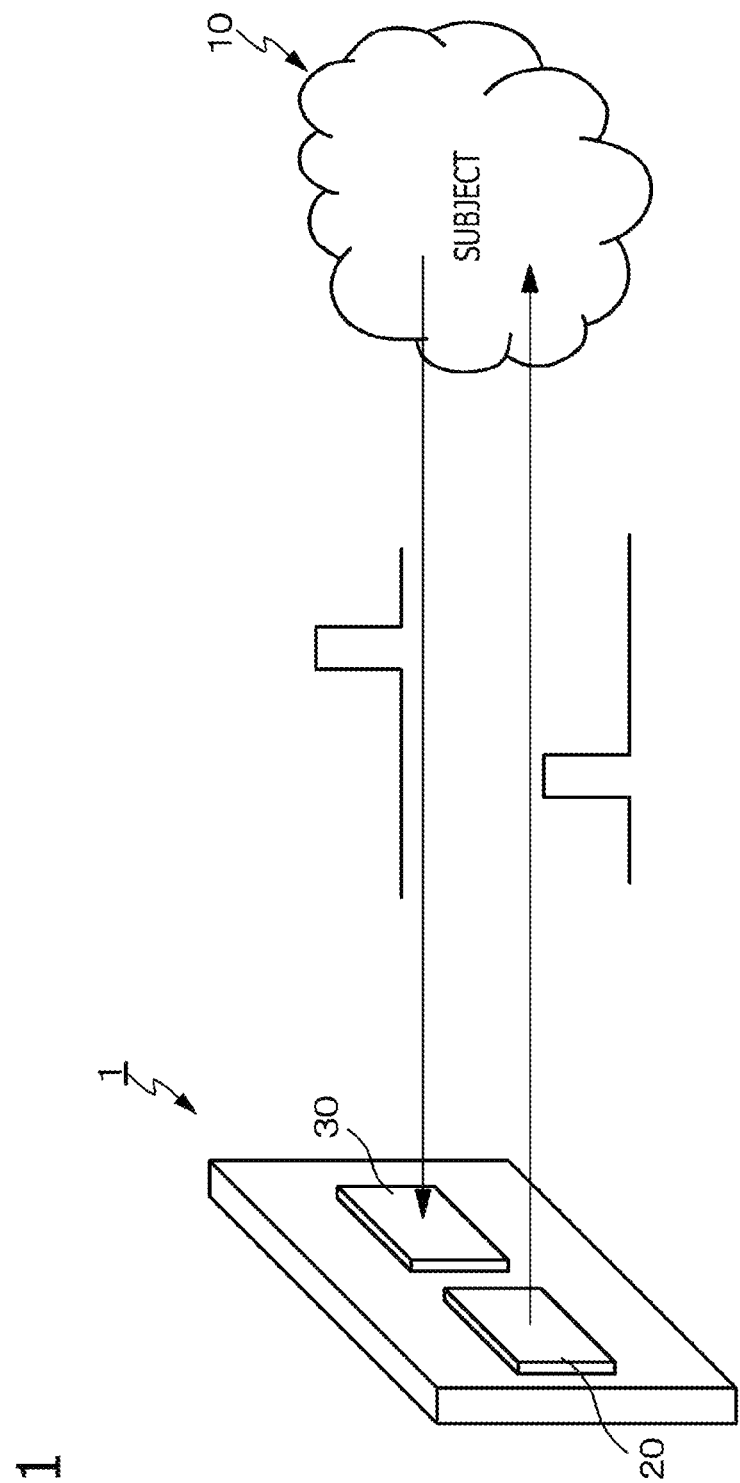

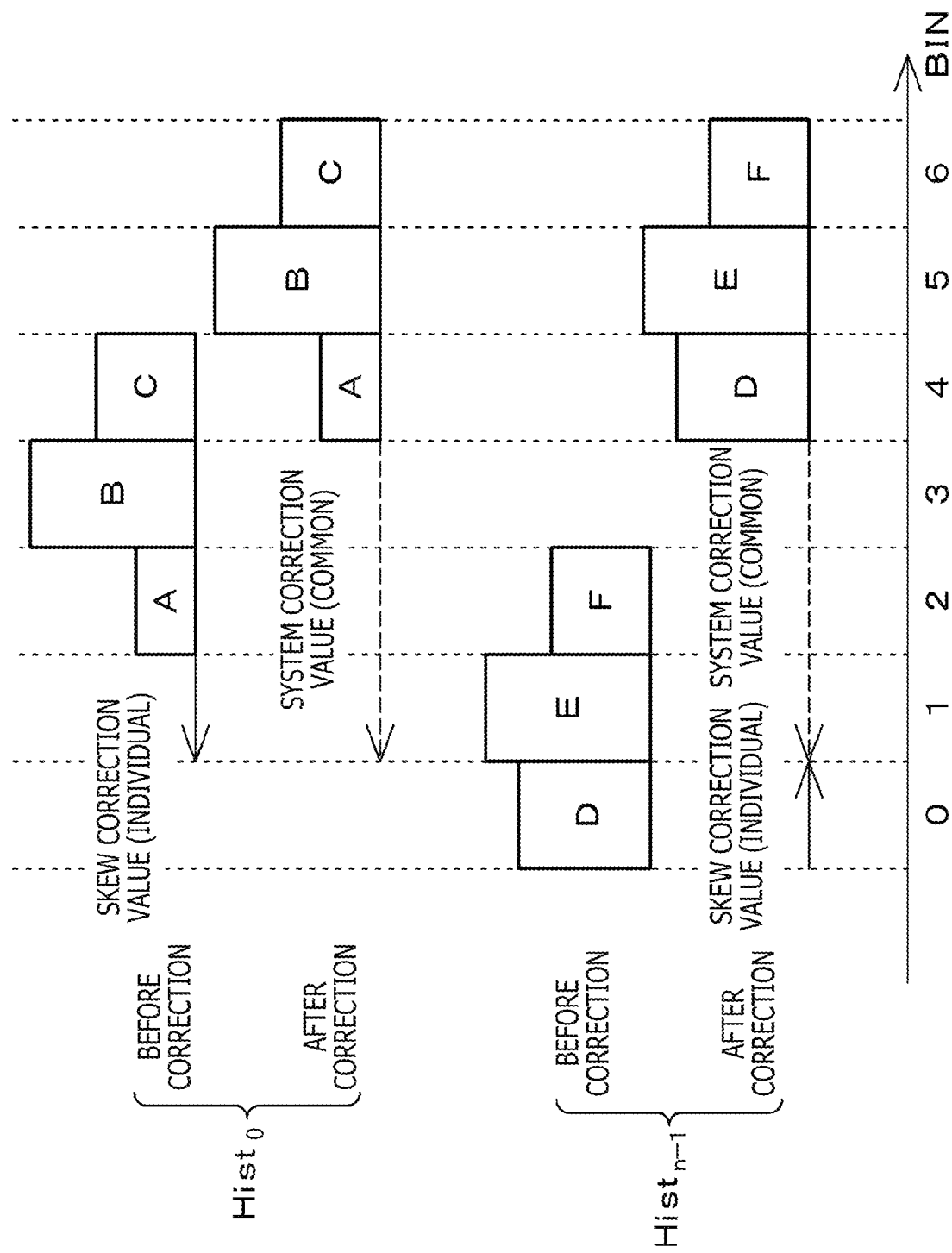

LIGHT RECEIVING APPARATUS AND DISTANCE MEASURING APPARATUS

TECHNICAL FIELD

The present disclosure relates to a light receiving apparatus and a distance measuring apparatus.

BACKGROUND ART

Some light receiving apparatuses use, as light receiving elements, elements generating signals in response to reception of photons (see, for example, PTL 1). Light receiving apparatuses of this type adopt, as a measurement method for measuring a distance to a measurement target, a TOF (Time Of Flight) method for measuring the time from radiation of light toward the measurement target until the light returns after being reflected by the measurement target. In a direct TOF method, which is one type of the TOF method and involves directly calculating the distance from a difference in time of flight of light, the time of flight of photons needs to be accurately determined.

In a light receiving apparatuses in which pixels are arranged in a two-dimensional shape and each include a light receiving element, the light receiving apparatus acquiring a three-dimensional depth map (depthmap), a length of a path from each pixel to a time-to-digital converter (TDC) varies, disadvantageously leading to a propagation delay skew (hereinafter referred to as an "in-plane delay skew") in a two dimensional plane.

CITATION LIST

Patent Literature

[PTL 1]
Japanese Patent Laid-Open No. 2016-211881

SUMMARY

Technical Problems

To eliminate the in-plane delay skew, a possible technique involves directly adding buffers for delay adjustment to wiring in paths from a plurality of light receiving elements (pixels) to the time to digital converter (TDC). However, a variation in characteristics among the added buffers may further deteriorate the in-plane delay skew. Consequently, correcting the in-plane delay skew using the technique for adding the buffers is difficult.

Additionally, correction of the in-plane delay skew can be performed using an application processor provided in a later stage of the light receiving apparatus. However, in a case where the application processor is used to correct the in-plane delay skew, the processing delay in the system as a whole occurs in units of frames in which all signals from the plurality of pixels are acquired. Thus, the processing delay becomes significant and as a result, adversely affects applications requiring immediate responses.

Thus, an object of the present disclosure is to provide a light receiving apparatus that can implement excellent correction processing on the in-plane delay skew and a distance measuring apparatus using the light receiving apparatus.

Solution to Problems

A light receiving apparatus of the present disclosure for achieving the above-described object includes a light receiving section with a plurality of pixels arranged in a two-dimensional shape, a signal line connected to each of the pixels, a time measuring section connected to the signal line and measuring a time from a light emission instruction timing to a light reception timing, a histogram creating section creating a histogram of a measured value measured by the time measuring section, a storage section storing correction values corresponding to positions of the pixels in the light receiving section, a correction processing section executing correction processing on the histogram created by the histogram creating section, on the basis of the correction values stored in the storage section, and an output section outputting a signal subjected to the correction processing by the correction processing section.

Additionally, a distance measuring apparatus of the present disclosure for achieving the above-described object includes a light source irradiating a measurement target with light, and a light receiving apparatus receiving light reflected by the measurement target, and as the light receiving apparatus, the light receiving apparatus configured as described above is used.

BRIEF DESCRIPTION OF DRAWINGS

FIG. 1 is a schematic configuration diagram depicting a distance measuring apparatus according to an embodiment of the present disclosure.

FIG. 13 is a diagram depicting a positional relation between data related to an uncorrected histogram and data related to a corrected histogram in a time axis direction in a case of Example 3.

DESCRIPTION OF EMBODIMENTS

Figure 2A:
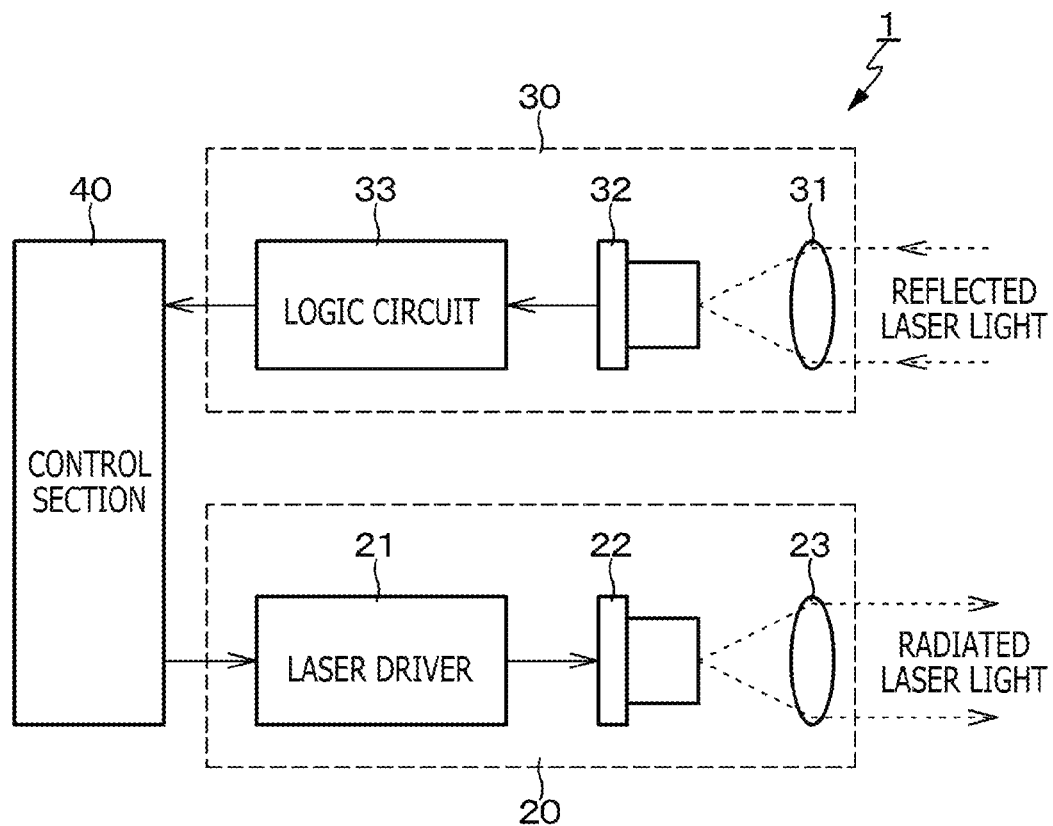
FIG. 2A and FIG. 2B are block diagrams depicting a specific configuration of the distance measuring apparatus according to an embodiment of the present disclosure.

Embodiments for implementing techniques of the present disclosure (hereinafter referred to as "embodiments") will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted. Note that descriptions will be given in the following order.

1. Description of Light Receiving Apparatus and Distance Measuring Apparatus of Present Disclosure in General
2. Distance Measuring Apparatus According to Embodiment
   2-1. Basic Configuration of Light Receiving Apparatus Using SPAD Elements
   2-2. Configuration of Light Receiving Section of Light Receiving Apparatus
   2-3. Basic Configuration of Signal Processing Section of Light Receiving Apparatus
   2-4. In-plane Delay Skew
3. Light Receiving Apparatus According to Embodiment
   3-1. Example 1 (Example in Which Correction Processing for In-plane Delay Skew Is Executed When Data Related to Histogram Is Read Out from Histogram Creating Section)
   3-2. Example 2 (Modified Example of Example 1: Example in Which Delay from Each Pixel to Time Measuring Section Tends to Be Linear within Plane)
   3-3. Example 3 (Modified Example of Example 1: Example in Which Correction Processing Is Also Executed on Delay Common to All Histograms)
   3-4. Example 4 (Example in Which Correction Processing for In-plane Delay Skew Is Executed When Data Related to Histogram Is Written to Histogram Creating Section)
4. Applied Example of Techniques According to Present Disclosure (Example of Moving Body)
5. Configurations That Can Be Taken by Present Disclosure <Description of Light Receiving Apparatus and Distance Measuring Apparatus of Present Disclosure in General>

A light receiving apparatus and a distance measuring apparatus in the present disclosure can be configured such that a correction value is a value based on a distance from a pixel to a time measuring section. The light receiving apparatus and a distance measuring apparatus in the present disclosure can be configured such that, on the basis of a correction value for a pixel at an end in a light receiving section, correction values for other pixels can be calculated by linear interpolation.

The light receiving apparatus and the distance measuring apparatus of the present disclosure including the above-described preferred embodiments and configurations can be configured such that a plurality of histogram creating sections is provided corresponding to pixel rows in the light receiving section. In this case, the light receiving apparatus and the distance measuring apparatus can be configured such that a correction processing section executes correction processing for each of histograms created by each of the plurality of histogram creating sections. Additionally, the light receiving apparatus and the distance measuring apparatus can be configured such that the correction processing section executes correction processing in units of bins in the histogram.

Further, the light receiving apparatus and the distance measuring apparatus of the present disclosure including the above-described preferred embodiments and configurations can be configured such that the correction processing section executes correction processing using a system correction value common to all the histograms created by each of the plurality of histogram creating sections. The light receiving apparatus and the distance measuring apparatus of the present disclosure can be configured such that the system correction value is a value corresponding to a delay common to all the histograms created by each of the plurality of histogram creating sections.

Furthermore, the light receiving apparatus and the distance measuring apparatus including the above-described preferred embodiments and configurations can be configured such that the storage section includes a group of correction registers in which the correction value is set for each histogram. Further, the light receiving apparatus and the distance measuring apparatus can be configured such that the correction processing section is provided in a later stage of the histogram creating section and executes correction processing by adding the correction value to a bin value for the histogram created by each of the histogram creating sections. Alternatively, the light receiving apparatus and the distance measuring apparatus can be configured such that the correction processing section is provided in a former stage of the histogram creating section and executes correction processing by adding the correction value to each of the measured values measured by the time measuring section.

Additionally, the light receiving apparatus and the distance measuring apparatus including the above-described preferred embodiments and configurations can be configured such that the light receiving element in each of the pixels includes an element generating a signal in response to reception of photons.

Additionally, the light receiving apparatus and the distance measuring apparatus including the above-described preferred embodiments and configurations can be configured such that the light receiving section includes a group of pixels in units of a plurality of pixels, such that the signal lines include a group of signal lines in units of a plurality of signal lines, and such that each of a plurality of the pixels included in the group of pixels is connected to each of a plurality of the signal lines included in the group of signal lines, on a one-to-one basis.

<Distance Measuring Apparatus According to Embodiment>

FIG. 1 is a schematic configuration diagram depicting a distance measuring apparatus according to an embodiment of the present disclosure. A distance measuring apparatus 1 according to the present embodiment adopts, as a measurement method for measuring a distance to a subject 10 corresponding to a measurement target, a TOF (time of flight) method for measuring the time from radiation of light (for example, laser light with a peak wavelength in an infrared wavelength region) toward the subject 10 until the light returns after being reflected by the subject 10. To implement distance measurement according to the TOF method, the distance measuring apparatus 1 according to the present embodiment includes a light source 20 and a light receiving apparatus 30. As the light receiving apparatus 30, a light receiving apparatus according to an embodiment of the present disclosure described below is used.

Figure 2B:
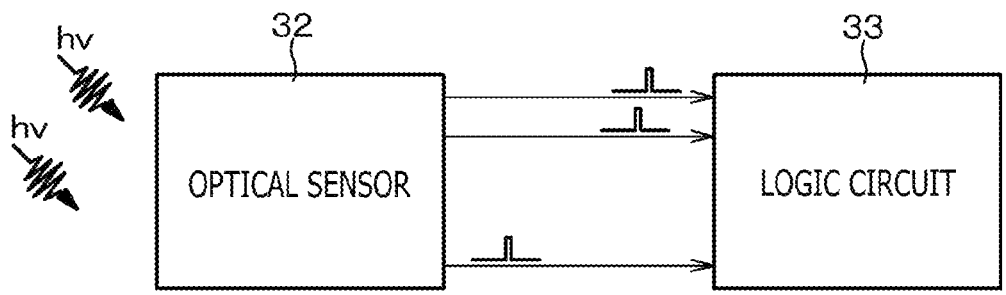

FIG. 2A and FIG. 2B depict a specific configuration of the distance measuring apparatus 1 according to the present embodiment. The light source 20 includes, for example, a laser driver 21, a laser light source 22, and a diffusing lens 23 to irradiate the subject 10 with laser light. The laser driver 21 drives the laser light source 22 under the control of a control section 40. The laser light source 22 includes, for example, a semiconductor laser to emit laser light by being driven by the laser driver 21. The diffusing lens 23 diffuses laser light emitted from the laser light source 22 to irradiate the subject 10 with the laser light.

The light receiving apparatus 30 includes a light receiving lens 31, an optical sensor 32 that is a light receiving section, and a logic circuit 33 and receives reflected laser light corresponding to radiated laser light reflected by the subject 10 after being emitted from a laser irradiation section 20. The light receiving lens 31 focuses the reflected laser light from the subject 10 on a light receiving surface of the optical sensor 32. The optical sensor 32 receives the reflected laser light from the subject 10 in units of pixels, the reflected laser light having passed through the light receiving lens 31, and then performs photoelectric conversion.

An output signal from the optical sensor 32 is fed to the control section 40 via the logic circuit 33. The optical sensor 32 will be described below in detail. The control section 40 includes, for example, a CPU (Central Processing Unit) and the like, and controls the light source 20 and the light receiving apparatus 30 and measures a time t from radiation of laser light from the light source 20 toward the subject 10 until the laser light returns after being reflected by the subject 10. On the basis of the time t, a distance L to the subject 10 can be obtained.

A method for time measurement involves starting a timer at a timing when pulsed light is radiated from the light source 20, stopping the timer at a timing when the light receiving apparatus 30 receives the pulsed light, and measuring the time t. Another method for time measurement may involve radiating pulsed light from the light source 20 with a predetermined period, detecting the period when the light receiving apparatus 30 receives the pulsed light, and measuring the time t from a phase difference between the period of light emission and the period of light reception. The time measurement is performed a plurality of times to measure the time t by detecting a peak of a histogram created by accumulating up times measured a plurality of times.

As the optical sensor 32, a two-dimensional array sensor (what is called an area sensor) in which pixels each including a light receiving element are two-dimensionally arranged in a matrix (array) may also be used, or a one-dimensional array sensor (what is called a line sensor) in which pixels each including a light receiving element are linearly arranged may also be used.

In the present embodiment, as the optical sensor 32, a sensor in which the light receiving element of each of the pixels includes an element generating a signal in response to reception of photons, for example, an SPAD (Signal Photon Avalanche Diode) element, is used. Specifically, the light receiving apparatus 30 according to the present embodiment is configured such that the light receiving element of each pixel includes an SPAD element. Note that the light receiving element is not limited to the SPAD element and may be any of various elements such as an APD (Avalanche Photo Diode) and a CAPD (Current Assisted Photonic Demodulator).

[Basic Circuit of Light Receiving Apparatus Using SPAD Elements]

Figure 3:
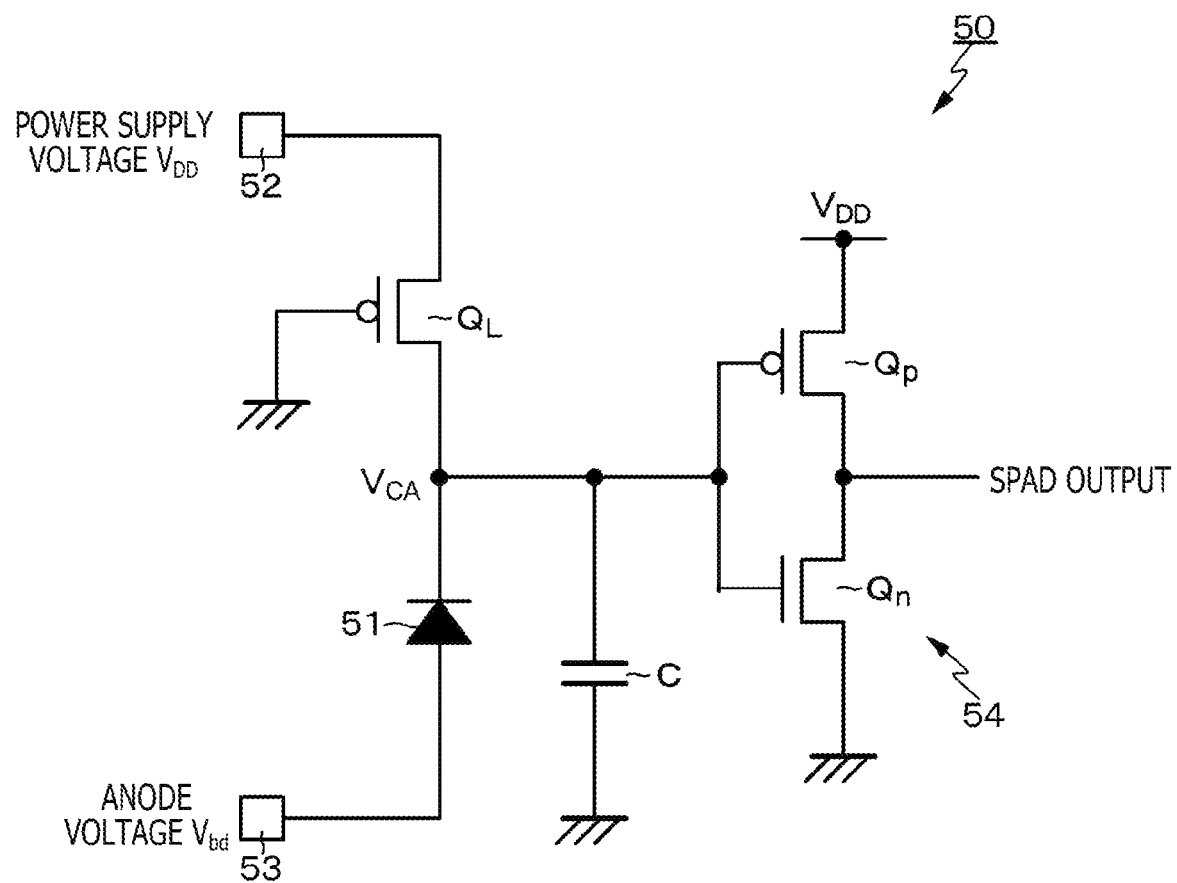
FIG. 3 is a circuit diagram depicting a basic pixel circuit of the light receiving apparatus using SPAD elements.

FIG. 3 depicts a circuit diagram of a basic pixel circuit of the light receiving apparatus 30 using SPAD elements. Here, the basic configuration for one pixel is depicted.

A pixel circuit in a pixel 50 according to the present embodiment is configured such that a cathode electrode of an SPAD element 51 that is connected, via a P-type MOS transistor $Q_L$ that is a load, to a terminal 52 to which a power supply voltage $V_{DD}$ is provided and such that an anode electrode is connected to a terminal 53 to which an anode voltage $V_{bd}$ is provided. As the anode voltage $V_{bd}$, a large negative voltage at which avalanche multiplication occurs is applied. A capacitive element C is connected between the anode electrode and a ground. A cathode voltage $V_{CA}$ of the SPAD element 51 is derived as an SPAD output (pixel output) via a CMOS inverter 54 including a P-type MOS transistor $Q_p$ and an N-type MOS transistor $Q_n$ connected in series.

Figure 4A:
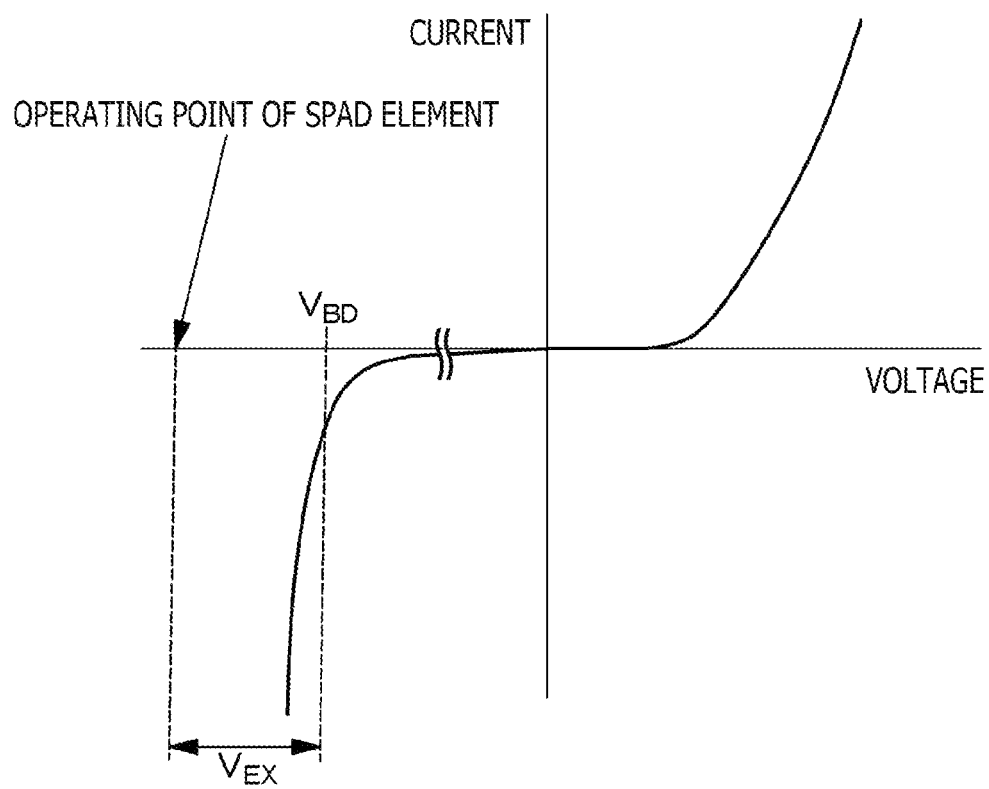
FIG. 4A is a characteristic diagram depicting a current-voltage characteristic of a PN junction of the SPAD element.

A voltage equal to or higher than a breakdown voltage $V_{BD}$ is applied to the SPAD element 51. An excess voltage equal to or higher than the breakdown voltage $V_{BD}$ is referred to as an excess bias voltage $V_{EX}$ and is typically approximately 2 to 5 V. The SPAD element 51 operates in a region referred to as a Geiger mode in a region with no DC stability point. FIG. 4A depicts an I (current)-V (voltage) characteristic of the PN junction of the SPAD element 51.

Figure 4B:
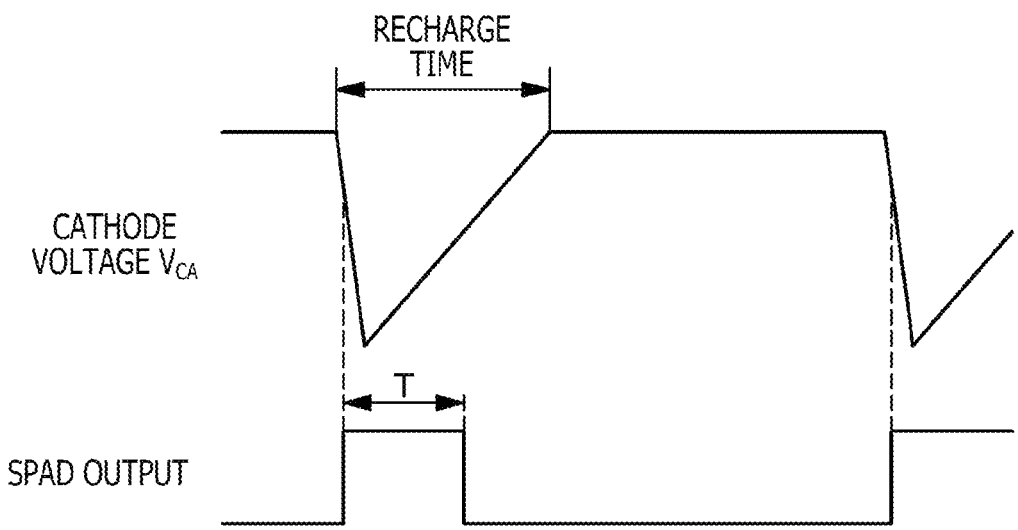
FIG. 4B is a waveform diagram for description of circuit operations of the pixel circuit.

Now, circuit operations of the pixel circuit in the pixel 50 configured as described above will be described using a waveform diagram in FIG. 4B.

With no current flowing through the SPAD element 51, a voltage $V_{DD}-V_{bd}$ is applied to the SPAD element 51. The voltage value $(V_{DD}-V_{bd})$ is $(V_{BD}+V_{EX})$. In addition, avalanche multiplication is caused by electrons generated at the PN junction of the SPAD element 51 due to a generation rate of dark current DCR (Dark Count Rate) or light irradiation. Then, an avalanche current is generated. This phenomenon stochastically occurs in a light blocked state (that is, the state in which no light is incident). This is the generation rate of dark current DCR.

When the cathode voltage $V_{CA}$ decreases to make the voltage across terminals of the SPAD element 51 equal to the breakdown voltage $V_{BD}$ of an PN diode, the avalanche current is stopped. Then, electrons generated and accumulated by avalanche multiplication are discharged by a resistance element R (or a P-type MOS transistor $Q_L$), and the cathode voltage $V_{CA}$ increases up to the power supply voltage $V_{DD}$, thus returning to an initial state again.

When light enters the SPAD element 51 to generate at least one electron-hole pair, an avalanche current is generated using the electron-hole pair as a seed. Thus, incidence of even one photon can be detected at a certain probability PDE (Photon Detection Efficiency). The probability PDE at which the photon can be detected is normally approximately several percent to 20%, in many cases.

The above-described operations are repeated. Then, in the series of operations, the cathode voltage $V_{CA}$ has the waveform thereof shaped by a CMOS inverter 54, and an SPAD output (pixel output) is a pulse signal with a pulse width T for which a start point corresponds to an arrival time of one photon.

[Configuration of Light Receiving Section of Light Receiving Apparatus]

Figure 5:
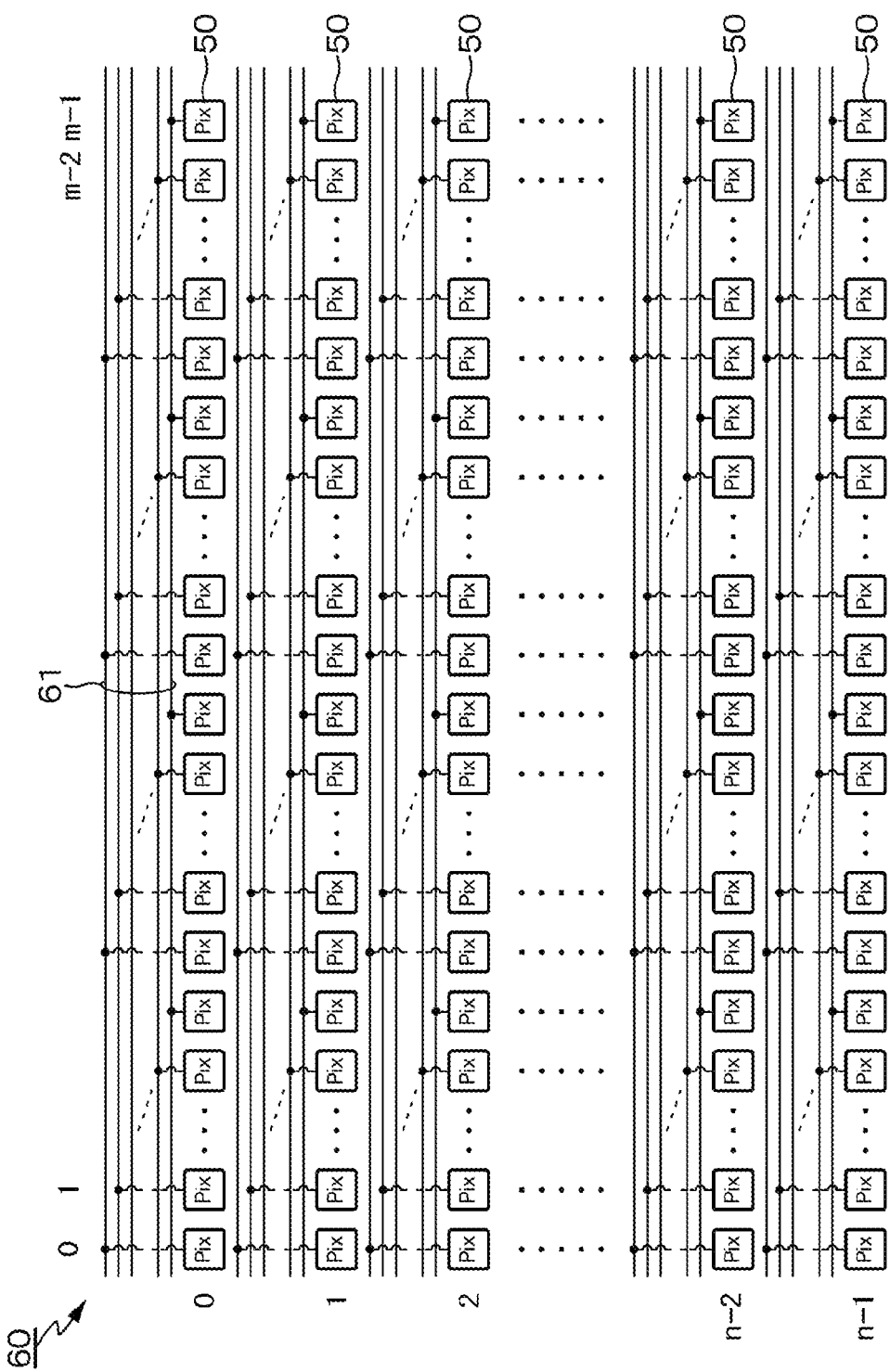
FIG. 5 is a schematic plan view depicting an example of a light receiving section of the light receiving apparatus.

An example of a configuration of the light receiving section of the light receiving apparatus 30 in which the pixels 50 configured as described above are two-dimensionally arranged in a matrix will be described with reference to FIG. 5. FIG. 5 illustrates a light receiving section 60 including a set of the pixels 50 two-dimensionally arranged in n rows and m columns.

The light receiving section 60 includes a plurality of signal lines 61 for the respective pixel rows in a pixel arrangement of n rows and m columns. For the pixels 50 provided in units of the number of the signal lines 61, one pixel is connected to the signal line 61 for each unit. Specifically, x pixels 50 are defined as a unit and are sequentially connected to the x signal lines 61 in a manner in which a first pixel within the unit is connected to a first one of x signal lines 61, a second pixel within the unit is connected to a second one of x signal lines 61, . . . , and so on. Note that the "group of pixels" described in the claims is an example of the unit of x pixels 50. The "group of signal lines" described in the claims is an example of the unit of x signal lines 61.

Figure 6:
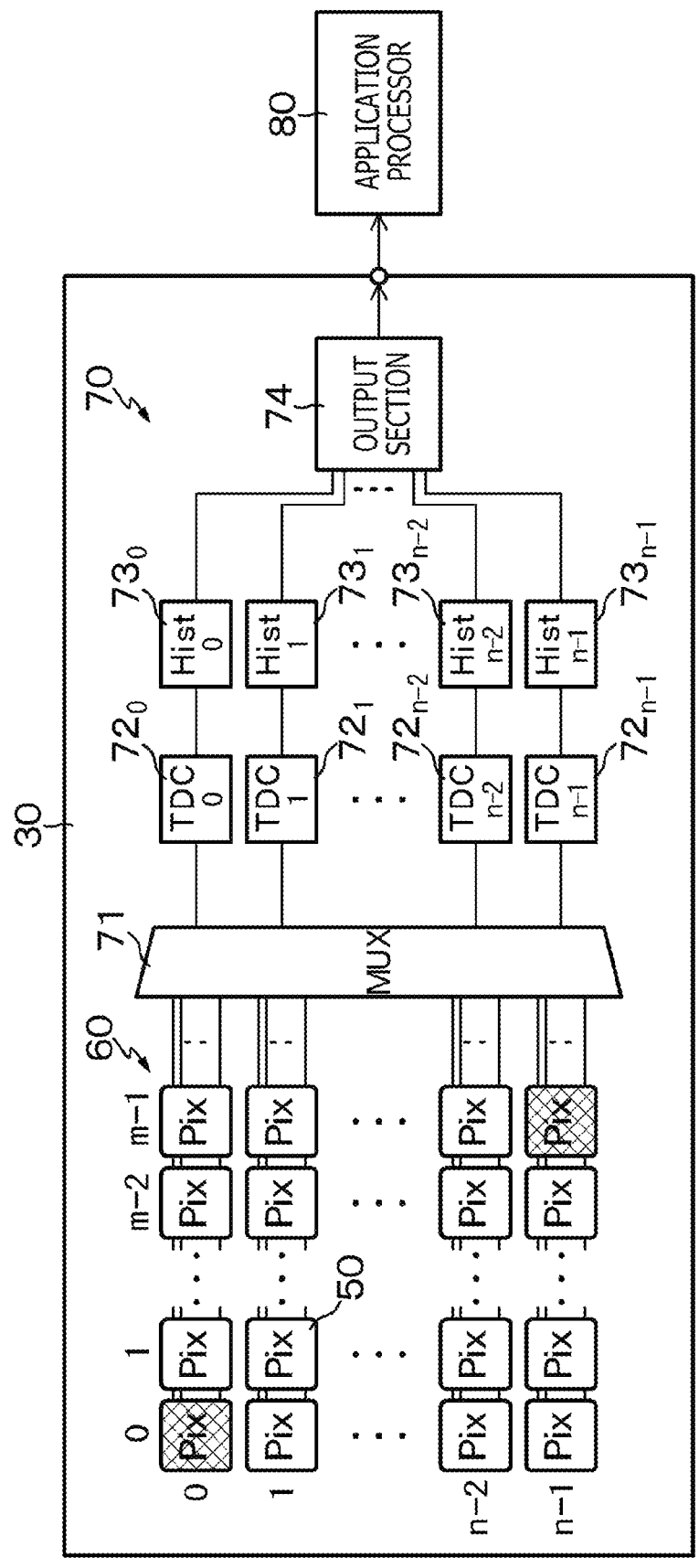
FIG. 6 is a block diagram depicting a basic configuration of a distance measurement control section of the light receiving apparatus.

Thus, in one pixel row, signals from every x pixels 50 are transmitted to the succeeding distance measurement control section 70 through the same signal line 61 shared by the signals (see FIG. 6). However, timing control for each pixel 50 is performed such that every x pixels 50 sharing the same signal line 61 are not simultaneously active, that is, such that every x pixels 50 use the same signal line 61 in a time division manner.

With such a configuration adopted, even in a case where pulse signals are substantially simultaneously output from adjacent pixels, the pulse signals are output through the different signal lines 61, enabling prevention of interference in the plurality of pulse signals. Note that the number x of the pixels 50 defined as the unit is desirably as large as possible but that an excessively large x requires a larger space in which the signal lines 61 are arranged and is not desirable in terms of layout. The number x of pixels 50, defined as the unit, may range from 2 to 50 and may further desirably range from 5 to 15.

[Basic Configuration of Distance Measurement Control Section of Light Receiving Apparatus]

FIG. 6 depicts a basic configuration of a distance measurement control section of the light receiving apparatus 30. The light receiving apparatus 30 includes the light receiving section 60 corresponding to the optical sensor 32 in FIG. 2A and a distance measurement control section 70 corresponding to the logic circuit 33 in FIG. 2A. The distance measurement control section 70 processes signals of the pixels 50 fed from the light receiving section 60 through the signal lines 61.

The distance measurement control section 70 includes a multiplexer (MUX) 71, a time measuring section (TDC) 72, a histogram creating section (Hist) 73, and an output section 74. Provided are n time measuring sections 72 and n histogram creating sections 73 ($72_0$ to $72_{n-1}$ and $73_0$ to $73_{n-1}$) corresponding to pixel rows 0 to n-1 of the light receiving section 60.

For each pixel row of the light receiving section 60, the multiplexer 71 sequentially selects signals of the pixels 50 fed through the x signal lines 61 and feeds the signals to the time measuring sections $72_0$ to $72_{n-1}$. The time measuring sections $72_0$ to $72_{n-1}$ measure, for each of the pixel rows in the light receiving section 60, the time from a timing for giving light emission instruction to the laser light source 22 to a timing for light reception at the light receiving element of the pixel 50. Specifically, the time measuring sections $72_0$ to $72_{n-1}$ use a well-known TOF method to measure the time from radiation of laser light from the laser light source 22 toward a subject that is a measurement target until the laser light is received by the light receiving element of the pixel 50 after being reflected by the subject.

The distance measurement control section 70 performs measurement, for example, dozens of times or several hundreds of times during one measurement sequence. Then, each of the histogram creating sections $73_0$ to $73_{n-1}$ creates a histogram of measured values (time) repeatedly measured by a corresponding one of the time measuring sections $72_0$ to $72_{n-1}$, specifically, a histogram indicating time on a horizontal axis and a measurement frequency on a vertical axis.

The output section 74 sequentially outputs, for each pixel row, data related to the histogram created by each of the histogram creating sections $73_0$ to $73_{n-1}$, to an application processor 80 provided outside the light receiving apparatus 30, as information regarding the time of flight (TOF) of laser light from the light emission instruction timing to the light reception timing.

The application processor 80 corresponds to the control section 40 in FIG. 2A and extracts the maximum value of the histogram on the basis of the data related to the histogram output through the output section 74. Then, the application processor 80 calculates, as a distance to the subject, the distance corresponding to the maximum value of the extracted histogram.

As described above, a histogram of the measured values (time) measured by each of the time measuring sections $72_0$ to $72_{n-1}$ is created, and the maximum value of the histogram is extracted as the time of flight of laser light from the light emission instruction timing to the light reception timing. This allows the time of flight to be accurately measured without being affected by ambient light and the like.

[In-Plane Delay Skew]

As described above, in the light receiving apparatus 30 in which the plurality of pixels 50 is two-dimensionally arranged, the pixels 50 and the distance measurement control section 70 are connected together through the signal lines 61 provided for the respective pixel rows. Thus, the lengths of paths from the pixels 50 to the time measuring sections $72_0$ to $72_{n-1}$ vary. In this manner, in a case where the lengths of the paths from the pixels 50 to the time measuring sections $72_0$ to $72_{n-1}$ vary, wiring delay in the signal lines 61 disadvantageously lead to two-dimensional in-plane delay skew.

Figure 7:
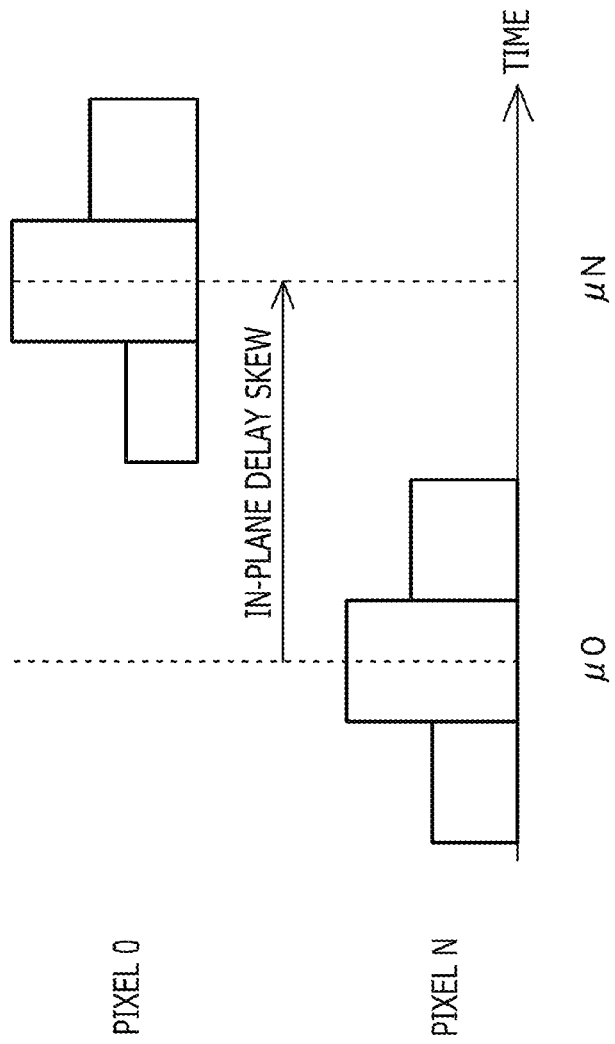
FIG. 7 is a diagram illustrating two-dimensional in-plane delay skew.

For example, in FIG. 6, when the pixel 50 in 0th row and 0th column is defined as a pixel 0 and the pixel 50 in n–1th row and m–1th column is defined as a pixel N, in-plane delay skew occurs between the maximum value of the histogram for the pixel 0 and the maximum value of the histogram for the pixel N as depicted in FIG. 7. In the histogram in FIG. 7, the horizontal axis indicates time, whereas the vertical axis indicates measurement frequency.

When the application processor 80 provided in a later stage of the light receiving apparatus 30 is used to correct the in-plane delay skew, the application processor 80 executes processing with the data related to the histogram accumulated in a memory, thus causing the processing delay in the system as a whole to occur in units of frames. Consequently, the processing delay is significant, thereby adversely affecting applications requiring immediate responses. Incidentally, the light receiving apparatus 30 with a driving frequency of 60 fps has a processing delay of approximately 17 milliseconds.

An example of the application requiring an immediate response may be cooperative control intended for automatic driving operation or the like in which a vehicle is caused to travel autonomously without depending on operation of a driver by controlling a drive force generating apparatus, a steering mechanism, a brake apparatus, or the like on the basis of information regarding surroundings of a vehicle acquired by the distance measuring apparatus 1 including the present light receiving apparatus 30.

<Light Receiving Apparatus According to Embodiment>

In the present embodiment, correction of the in-plane delay skew is performed in the light receiving apparatus 30 to implement high-speed correction processing for the in-plane delay skew. More specifically, the histograms created by the histogram creating sections $73_0$ to $73_{n-1}$ are generally shifted in the time axis direction to implement the correction of the in-plane delay skew. As described above, the light receiving apparatus 30 according to the present embodiment can implement high-speed correction processing for the in-plane delay skew and can thus be used for applications requiring immediate responses (high-speed responses), such as automatic driving operation and distance measurement for a measurement target corresponding to a moving subject.

A specific example of the present embodiment in which, in the light receiving apparatus 30, histograms are generally shifted in the time axis direction to perform correction of the in-plane delay skew, will be described.

Example 1

Figure 8:
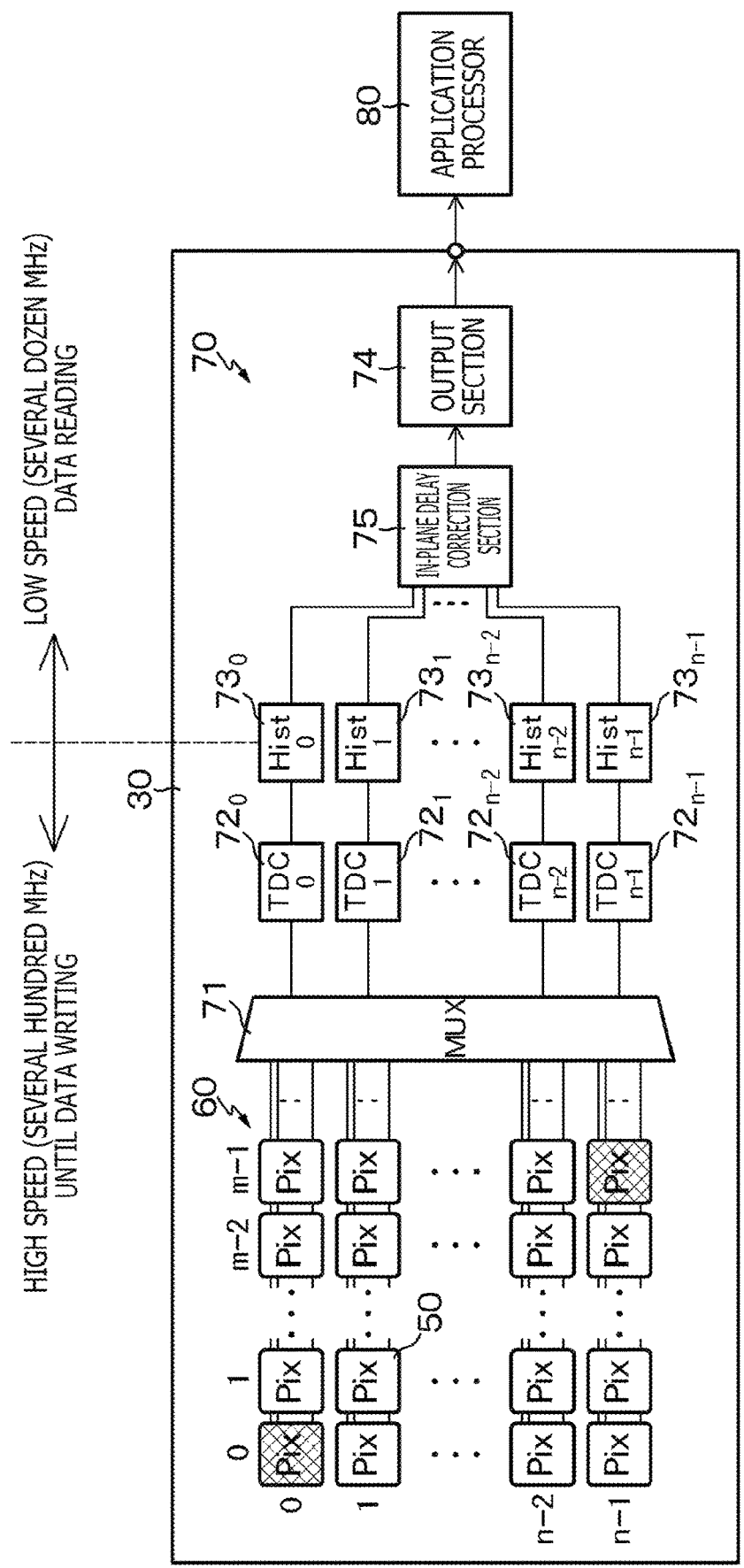
FIG. 8 is a block diagram depicting a configuration of a light receiving apparatus according to Example 1.

Example 1 is an example in which the correction processing for the in-plane delay skew is executed when respective pieces of data related to histograms are read out from the histogram creating sections $73_0$ to $73_{n-1}$. FIG. 8 depicts a configuration of the light receiving apparatus 30 according to Example 1.

As depicted in FIG. 8, the light receiving apparatus 30 according to Example 1 includes an in-plane delay correcting section 75 in a later stage of the histogram creating section 73, that is, in a former stage of the output section 74, and the in-plane delay correcting section 75 executing the correction processing for the in-plane delay skew.

In the light receiving apparatus 30 according to Example 1, the processing speed at which respective pieces of data related to measured values from the time measuring sections (TDC) $72_0$ to $72_{n-1}$ are written to the histogram creating sections $73_0$ to $73_{n-1}$ is high and approximately several hundred MHz. Additionally, the processing speed at which respective pieces of data related to histograms are read out from the histogram creating sections $73_0$ to $73_{n-1}$ is low and approximately several dozen MHz.

Figure 9:
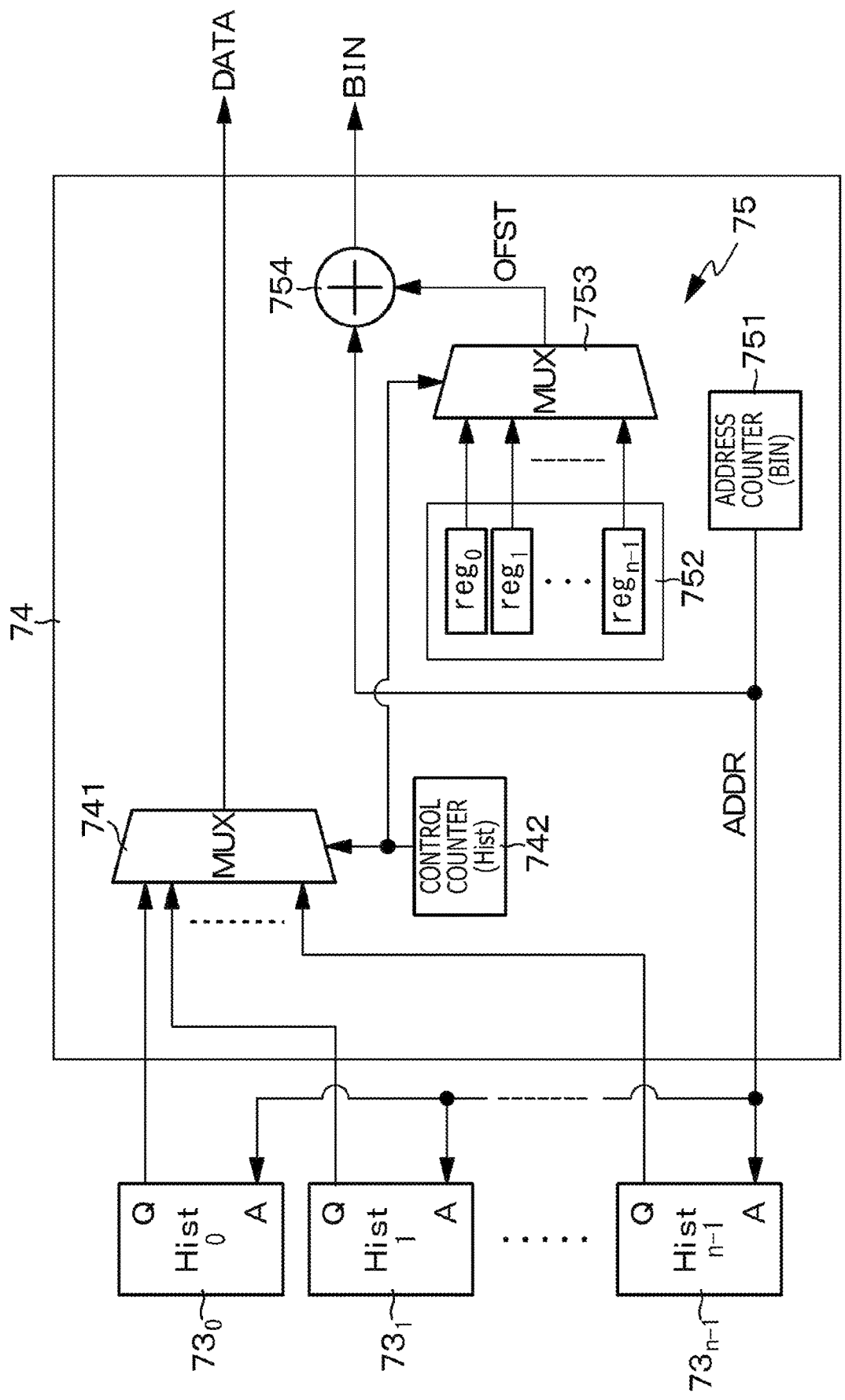
FIG. 9 is a block diagram depicting an example of a configuration of an in-plane delay correcting section of the light receiving apparatus according to Example 1.

FIG. 9 depicts an example of a configuration of the in-plane delay correcting section 75 in the light receiving apparatus 30 according to Example 1. Here, a configuration is illustrated in which the in-plane delay correcting section 75 is built in the output section 74. However, the present example is not limited to the built-in configuration.

The output section 74 includes a multiplexer (MUP) 741 and a control counter 742. The multiplexer 741 receives, as input, respective pieces of data related to histograms provided by the histogram creating sections $73_0$ to $73_{n-1}$, and under the control of the control counter 742, sequentially selects the pieces of data and outputs the selected pieces of data to the succeeding application processor 80 as data DATA related to corresponding one of the histograms.

The in-plane delay correcting section 75 includes an address counter 751, a storage section 752, a multiplexer (MUP) 753, and an adder 754. The address counter 751 controls addresses ADDR of histograms created by the histogram creating sections $73_0$ to $73_{n-1}$. The address ADDR is a bin value that is a unit of histograms and is provided to the adder 754 with two inputs, as one of the inputs to the adder 754.

The storage section 752 includes n correction registers $reg_0$ to $reg_{n-1}$ (correction register group) corresponding to the histogram creating sections $73_0$ to $73_{n-1}$ (that is, pixel rows in the light receiving section 60). The correction registers $reg_0$ to $reg_{n-1}$ store correction values (correction amounts) corresponding to the positions of the pixels 50 in the light receiving section 60. The correction values are values for correcting the in-plane delay skew, specifically, values based on the distances from the pixels 50 to the time measuring sections $72_0$ to $72_{n-1}$.

The correction values (correction amounts) stored in the correction registers $reg_0$ to $reg_{n-1}$ are specific to the light receiving apparatus 30 and can thus be pre-acquired in pre-shipment verification, evaluation measurement, or the like for the light receiving apparatus 30, by using a predetermined method, as values for correcting the in-plane delay skew. However, the present example is not limited to the acquisition through pre-shipment verification, evaluation measurement, or the like. For example, when the light receiving apparatus 30 is activated, the correction values can also be acquired using a predetermined technique and stored in the correction registers $reg_0$ to $reg_{n-1}$ of the storage section 752.

Under the control of the control counter 742, the multiplexer 753 sequentially selects the respective correction values in the correction registers $reg_0$ to $reg_{n-1}$ in synchronism with the multiplexer 741 and outputs a correction value OFST for generally shifting each of the histograms in the time axis direction. The correction value OFST corresponds to the other input of the adder 754 with two inputs.

For each histogram, the adder 754 adds, to the bin value BIN that is one of inputs of the adder 754, the correction value OFST that is the other input, to generally shift each histogram in the time axis direction. Thus, each histogram is generally shifted in the time axis direction to implement the correction processing for the in-plane delay skew.

Figure 10:
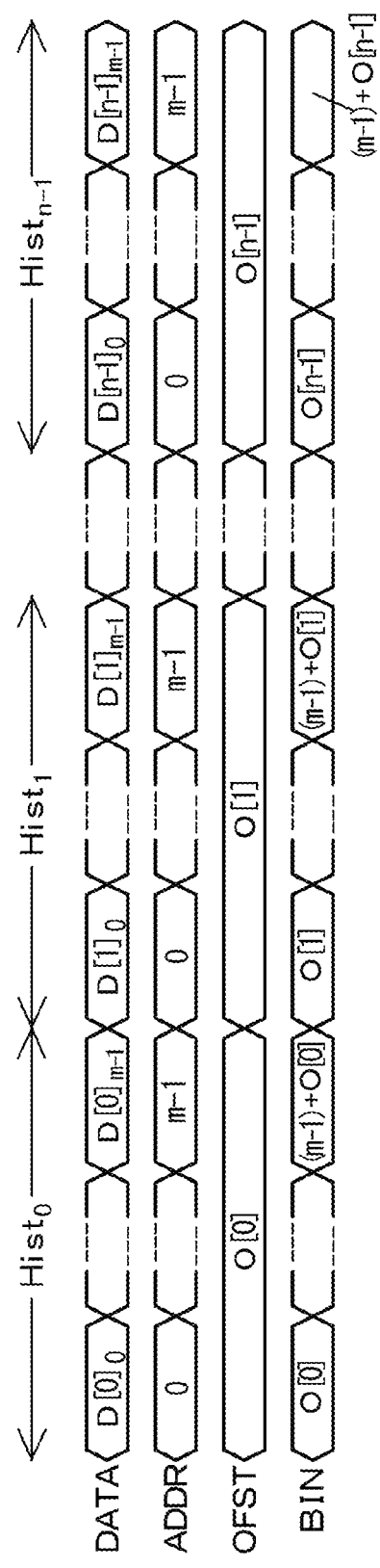
FIG. 10 is a timing chart depicting a timing relation among data DATA related to each histogram, the address ADDR of the histogram, a correction amount OFST, and a bin value BIN for each corrected histogram.

As is apparent from the above description, the in-plane delay correcting section 75 is a correction processing section which executes correction processing on the histograms created by the histogram creating sections $73_0$ to $73_{n-1}$, on the basis of the correction values stored in the storage section 752. FIG. 10 illustrates a timing chart for the data DATA related to each of the histograms, the address ADDR of the histogram, the correction value OFST, and the bin value BIN for each histogram subjected to correction.

Now, a flow of the correction processing for the in-plane delay skew in the light receiving apparatus 30 according to Example 1 will be described using a flowchart in FIG. 11A.

For correction of the in-plane delay skew, first, the correction values for correcting the in-plane delay skew are pre-acquired (step S11). The correction values specific to the light receiving apparatus 30 can be acquired, for example, during evaluation measurement by the light receiving apparatus 30 or during activation of the light receiving apparatus 30 by using the predetermined technique as described above.

Then, the pre-acquired correction values are set in the correction registers $reg_0$ to $reg_{n-1}$ of the storage section 752

(step S12). Then, the correction processing for the in-plane delay skew is executed by using, as the correction value OFST for generally shifting the histograms in the time axis direction, each of the correction values set (stored) in the correction registers $reg_0$ to $reg_{n-1}$ of the storage section 752, and adding the correction value OFST to the bin value BIN for the corresponding histogram to (step S13). This addition processing implements the correction of the in-plane delay skew to center each histogram.

With the above-described correction processing for the in-plane delay skew, when the respective pieces of data related to the histograms are read out from the histogram creating sections $73_0$ to $73_{n-1}$, for each histogram, the correction processing can be executed on the in-plane delay skew at high speed by the simple addition processing of adding the correction value OFST to the bin value BIN for each histogram. This processing is approximately one cycle of an operation clock and is a processing delay of approximately several dozen nanoseconds.

Consequently, compared to a case where the correction processing is executed by the succeeding application processor 80, the present example enables a significant reduction in processing delay. Incidentally, in a case where the succeeding application processor 80 executes the correction processing, the respective pieces of data related to the histograms are accumulated in the memory for processing. Thus, the processing delay in the system as a whole occurs in units of frames, and in a light receiving apparatus with a drive frequency of 60 fps, the processing delay is approximately 17 milliseconds.

Figure 11A:
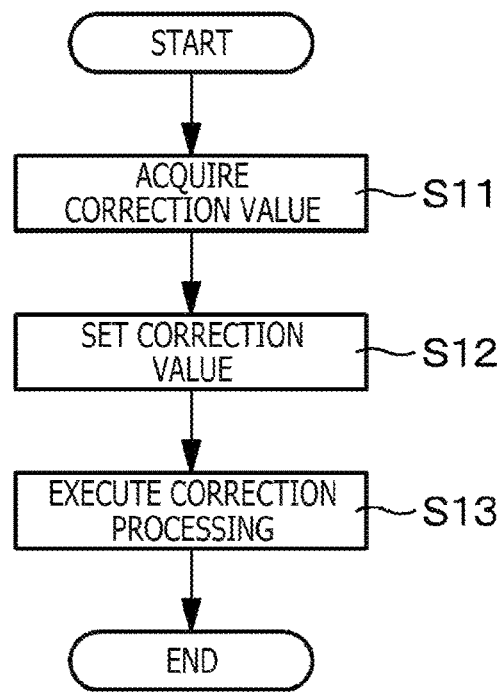
FIG. 11A is a flowchart depicting a flow of correction processing for in-plane delay skew in the light receiving apparatus according to Example 1.
Figure 11B:
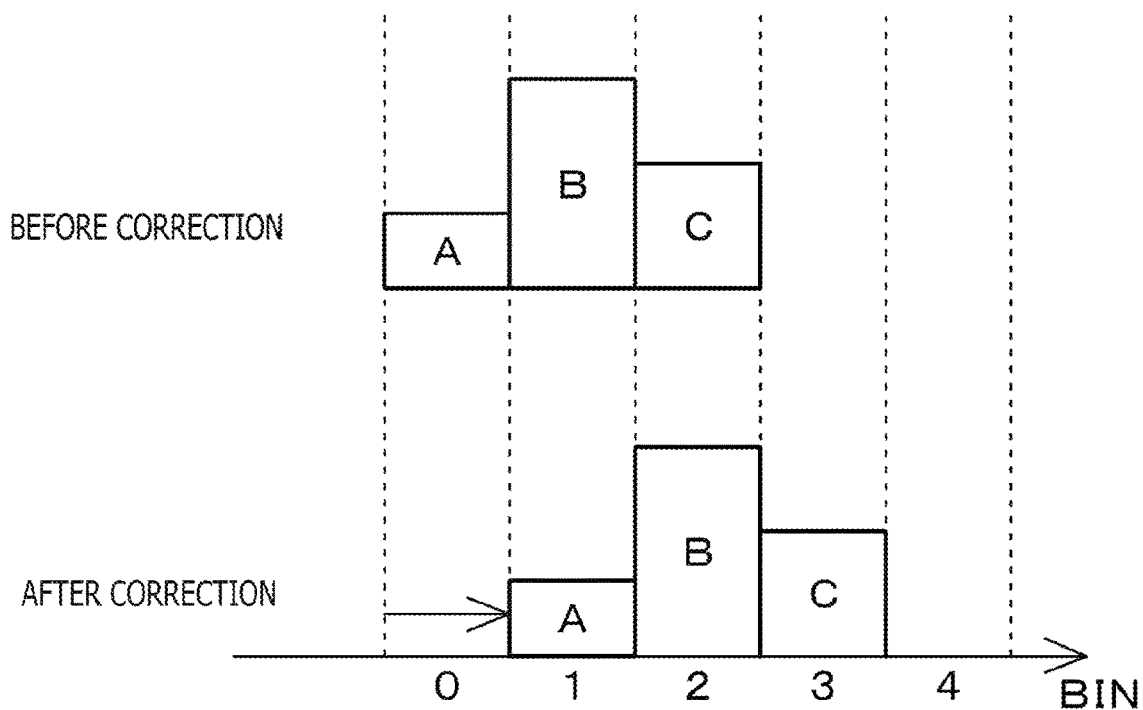
FIG. 11B is a diagram depicting a positional relation between data related to an uncorrected histogram and data related to a corrected histogram in a time axis direction in a case of Example 1.

FIG. 11B illustrates a positional relation between data related to an uncorrected histogram and data related to a corrected histogram in the time axis direction (BIN direction). Here, a case is illustrated where a histogram with three bins is generally shifted by one BIN in the BIN direction (time axis direction). As is apparent from FIG. 11B, correction with the correction value OFST is executed in units of bins. Note that, here, the correction with the correction value OFST is executed in units of bins but that the present example is not limited to the units of bins and that, for example, a half bin may be used as a unit or the resolution may further be increased.

Example 2

Example 2 is a modified example of Example 1 and corresponds to a case where the delays from the pixels 50 to the time measuring sections (TDC) $72_0$ to $72_{n-1}$ exhibit a linear tendency within the plane of the light receiving section 60.

Figure 12A:
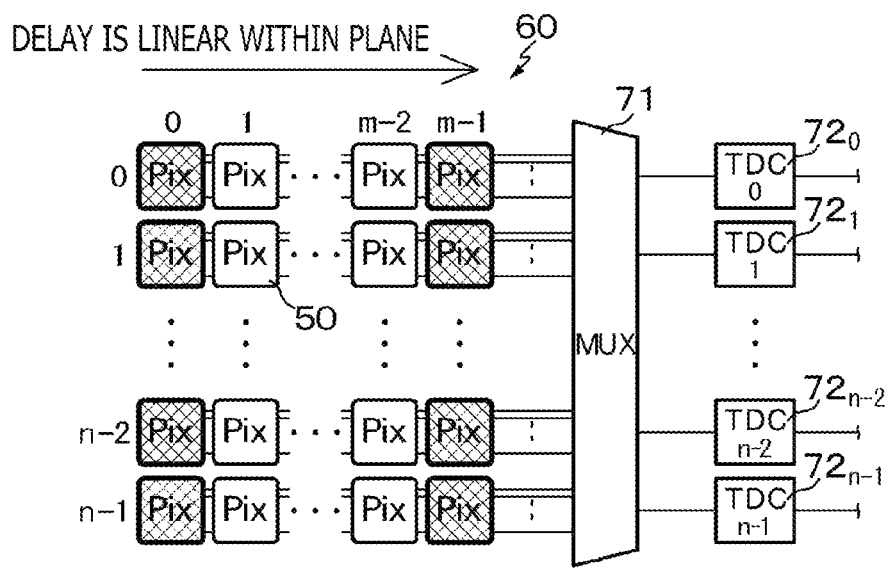
FIG. 12A is a diagram illustrating a positional relation of each pixel with respect to the time measuring section in a case of Example 2.
Figure 12B:
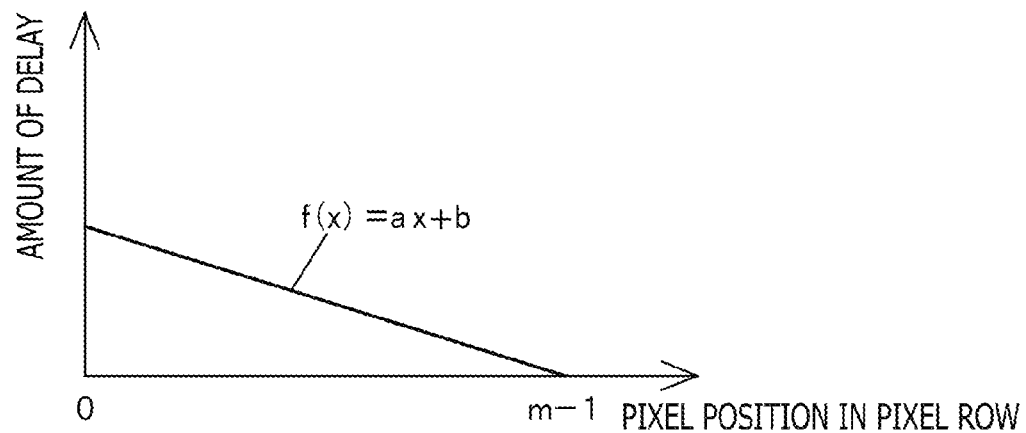
FIG. 12B is a diagram illustrating that the delay from each pixel to the time measuring section is linear within a plane.

Here, in a pixel arrangement of n rows and m columns in the light receiving section 60 illustrated in FIG. 12A, the amount of delay for the pixels is linear between the pixels 50 in the m–1th column, which is closest to the time measuring sections $72_0$ to $72_{n-1}$, and the pixels 50 in the 0th column, which is farthest from the time measuring sections $72_0$ to $72_{n-1}$, as illustrated in FIG. 12B.

In this manner, in a case where the delays from the pixels 50 to the time measuring sections $72_0$ to $72_{n-1}$ exhibit a linear tendency within the plane, in Example 2, from the correction value for the delay from the pixels 50 at an end of the light receiving section 60, that is, the pixels 50 in the first column, which is farthest from the time measuring sections $72n$ to $72_{n-1}$, the correction values for the other pixels 50, that is, the pixels 50 between the pixel column 0 and the pixel column m–1, are calculated by linear interpolation.

In the flowchart in FIG. 11A illustrating a flow of the correction processing for the in-plane delay skew, Example 2 in which the correction value is obtained by linear interpolation can shorten the time required for acquiring the correction values in step S11, compared to Example 1.

Example 3

Example 3 is a modified example of Example 1, and in Example 3, the correction processing is also executed on a delay common to all the histograms. Here, examples of the "delay common to all the histograms" include a processing delay in the circuit, a delay outside the light receiving apparatus 30, specifically, a delay in wiring through which a trigger signal for causing the laser light source 22 of the light source 20 illustrated in FIG. 2A to emit light is transmitted.

In Example 1, different delay corrections are performed for the respective histograms. However, besides the in-plane delay, the above-described delay common to all the histograms is present. The presence of the delay common to all the histograms leads to an error between a distance measured by the light receiving apparatus 30 and the actual distance, the error corresponding to the delay common to all the histograms.

Thus, in Example 3, different delay corrections are performed for the respective histograms, and the correction processing is executed also on the delay common to all the histograms by using a system correction value that is common to all the histogram and that corresponds to the delay common to all the histograms. The system correction value can be pre-calculated by, for example, dividing the difference (error) between the distance measured by the light receiving apparatus 30 and the actual difference by a light speed.

FIG. 13 illustrates a positional relation between data related to an uncorrected histogram and data related to a corrected histogram in the time axis direction (BIN direction). Here, a histogram $Hist_0$ and a histogram $Hist_{n-1}$ are illustrated; the histogram $Hist_0$ is created by the histogram creating sections $73_0$ corresponding to the pixel row 0, and the histogram $Hist_{n-1}$ is created by the histogram creating section $73_{n-1}$ corresponding to the pixel row n–1.

In FIG. 13, a solid arrow represents a skew correction value for a case where each histogram is individually corrected, and a dashed arrow represents a system correction value for a case where all the histograms are corrected in common. In the present example, the delay correction is performed in units of bins. However, the present example is not limited to the units of bins, and for example, a half bin may be used as a unit or the resolution may further be increased.

According to Example 3, in addition to different delay corrections for the respective histograms, a correction can be performed on the delay common to all the histograms. Thus, even with the presence of the delay common to all the histograms, the actual distance can be accurately measured.

Example 4

Figure 14:
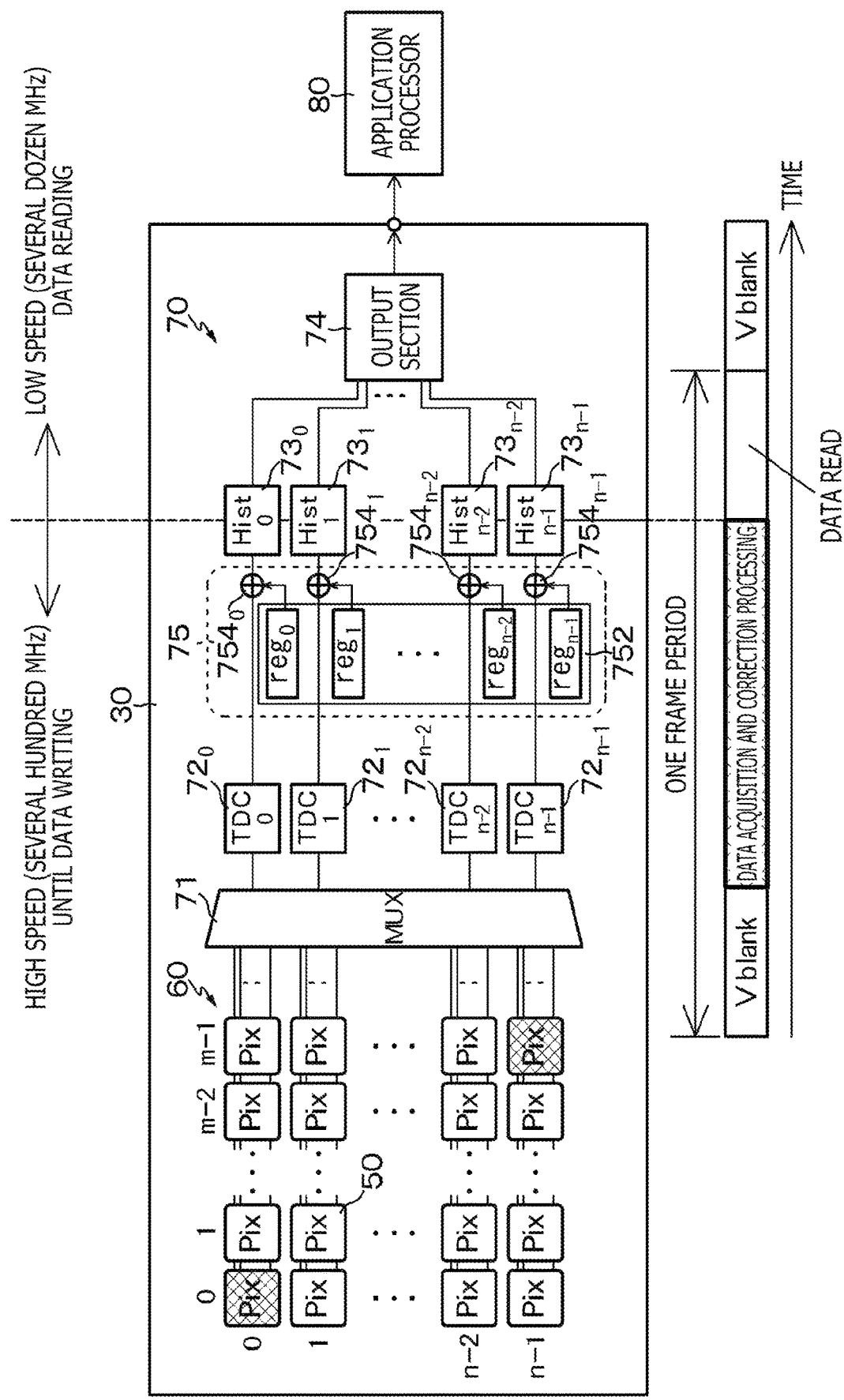
FIG. 14 is a block diagram depicting a configuration of a light receiving apparatus according to Example 4.

Example 4 is an example in which the correction processing for the in-plane delay skew is executed when the respective pieces of data related to the histograms are written to the histogram creating sections $73_0$ to $73_{n-1}$. FIG. 14 illustrates a configuration of the light receiving apparatus 30 according to Example 4.

As illustrated in FIG. 14, the light receiving apparatus 30 according to Example 4 includes the in-plane delay correcting section 75 in a former stage of the histogram creating sections $73_0$ to $73_{n-1}$, the in-plane delay correcting section 75 executing the correction processing for the in-plane delay skew. The in-plane delay correcting section 75 includes a storage section 752 storing correction values corresponding to the positions of the pixels 50 within the light receiving section 60, and n adders $754_0$ to $754_{n-1}$ provided in respective former stages of the histogram creating sections $73_0$ to $73_{n-1}$.

The storage section 752 includes n correction registers $reg_0$ to $reg_{n-1}$ (correction register group) corresponding to n time measuring sections $72_0$ to $72_{n-1}$. In the correction registers $reg_0$ to $reg_{n-1}$, correction values for correcting the in-plane delay skew, specifically, correction values based on the distances from the pixels 50 to the time measuring sections $72_0$ to $72_{n-1}$, are set as is the case with Example 1.

Each of the n adders $754_0$ to $754_{n-1}$ has, as one of the inputs, a measured value from the corresponding one of the time measuring sections $72_0$ to $72_{n-1}$ and has, as the other input, the correction value set in the corresponding one of the correction registers $reg_0$ to $reg_{n-1}$. Each of the adders $754_0$ to $754_{n-1}$ can execute the correction processing for the in-plane delay skew by adding the correction value from the corresponding one of the correction registers $reg_0$ to $reg_{n-1}$ for each histogram to the measured value from the corresponding one of the time measuring sections $72_0$ to $72_{n-1}$.

As described above, Example 4 in which the correction processing is executed when the respective pieces of data related to the histograms are written to the histogram creating sections $73_0$ to $73_{n-1}$ can execute the correction processing for the in-plane delay skew like Example 1 in which the correction processing is executed when the respective pieces of data related to the histograms are read out from the histogram creating sections $73_0$ to $73_{n-1}$. Further, as is the case with Example 1, the present example can substantially reduce the processing delay compared to the case where the correction processing is executed by the succeeding application processor 80.

Note that the technique in Example 2 and the technique in Example 3 can also be applied to Example 4; the technique in Example 2 involves calculating, by linear interpolation, the correction values for the pixels 50 between the 0th column and the m−1th column from the correction value for the delay from the pixels 50 in the 0th column, which is farthest from the time measuring sections $72_0$ to $72_{n-1}$, and the technique in Example 3 involves correcting the delay common to all the histograms.

Applied Examples of Techniques According to Present Disclosure

The techniques according to the present disclosure can be applied to various products. More specific applied examples will be described below. For example, the techniques according to the present disclosure may be implemented as a distance measuring apparatus mounted in any of various types of moving bodies such as an automobile, an electric car, a hybrid electric car, a motorcycle, a bicycle, a personal mobility, an airplane, a drone, a ship, a robot, a construction machine, and an agricultural machine (tractor).
[Mobile Body]

Figure 15:
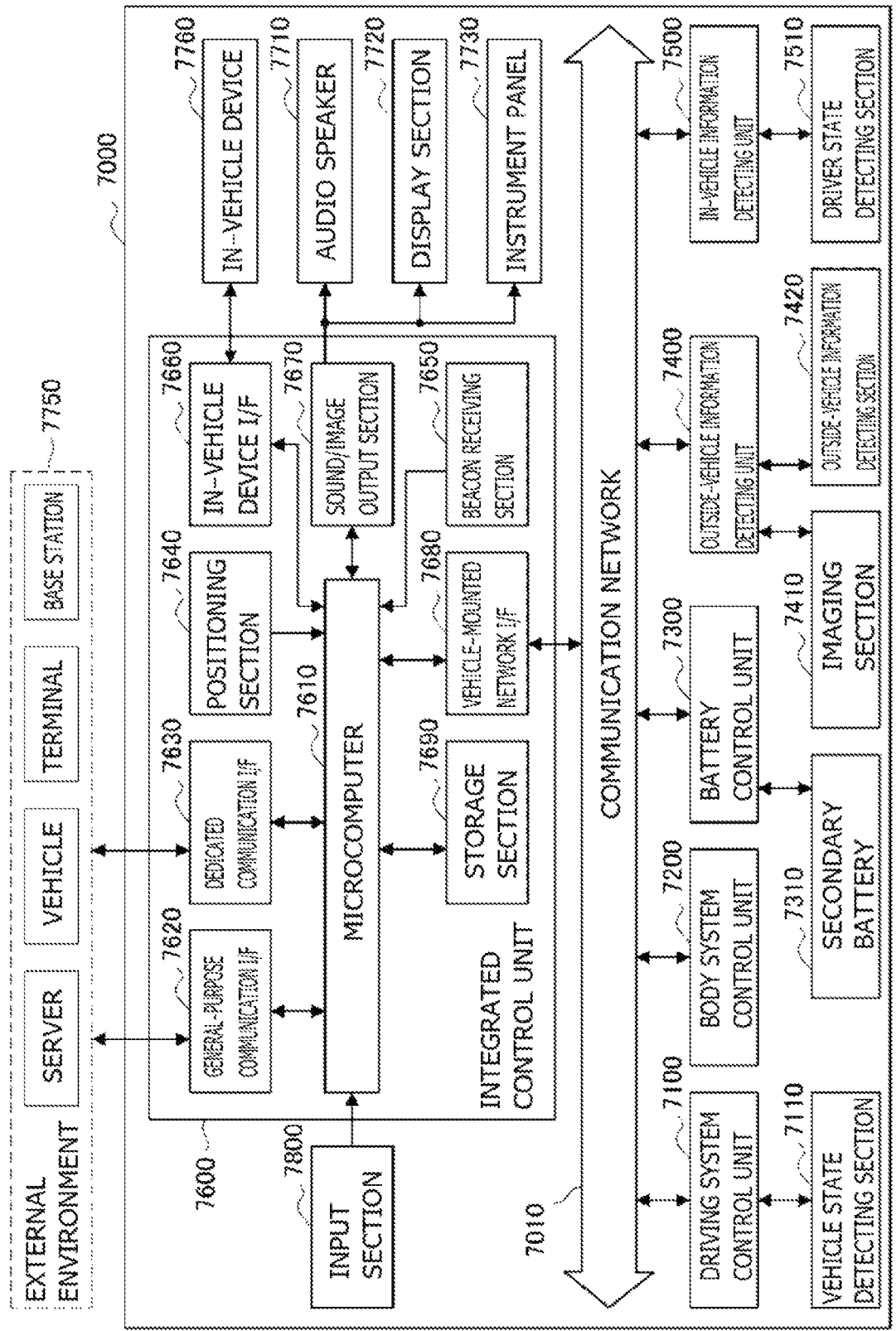
FIG. 15 is a block diagram depicting an example of schematic configuration of a vehicle control system which is an example to which the techniques according to the present disclosure can be applied.

FIG. 15 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 15, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 15 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 16:
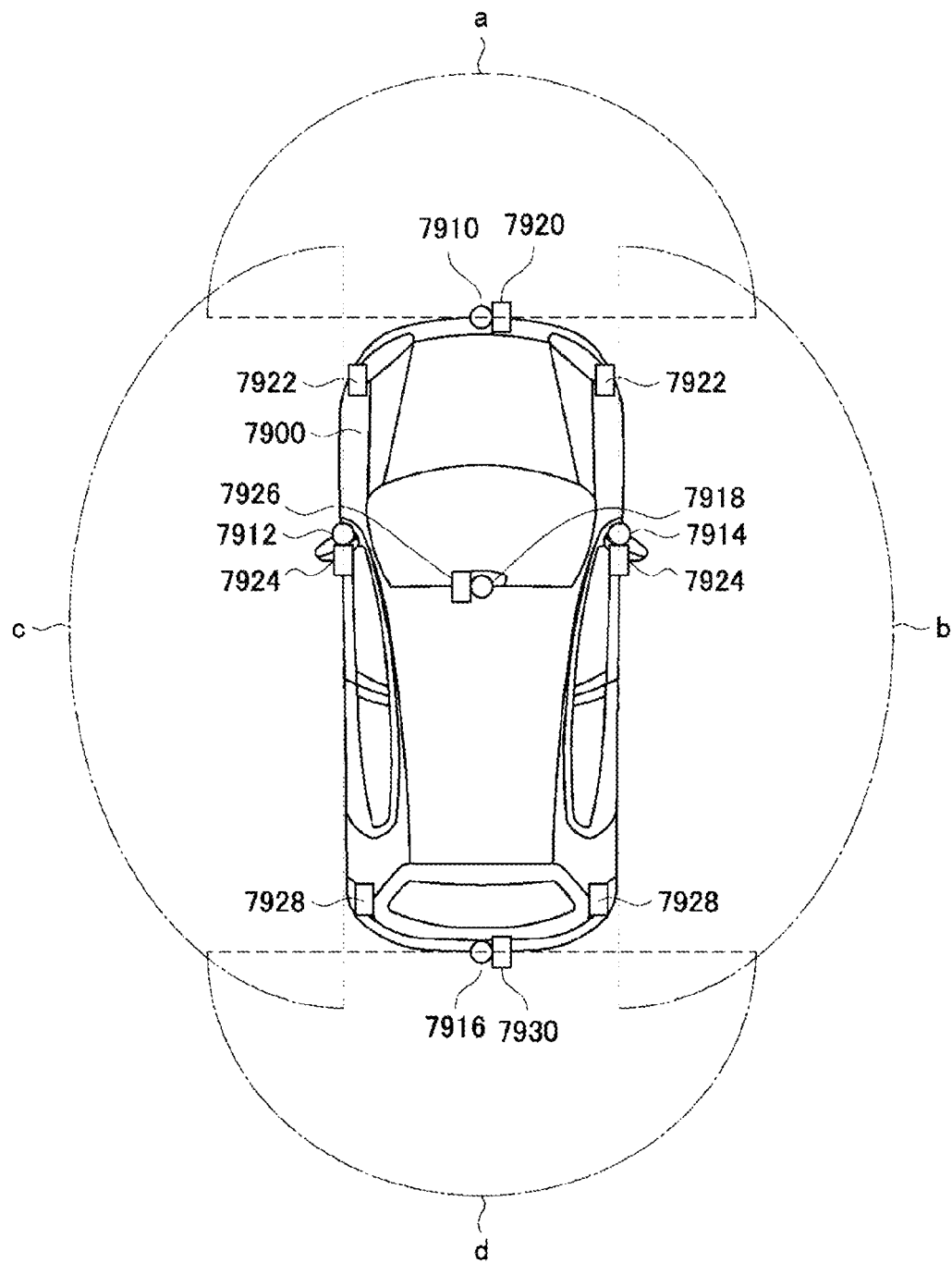
FIG. 16 is a diagram of assistance in explaining an example of an installation position of a distance measuring apparatus.

FIG. 16 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 16 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 15, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM) (registered trademark), worldwide interoperability for microwave access (WiMAX), long term evolution (LTE)), LTE-advanced (LTE-A), or the like, or another wireless communication protocol such as wireless LAN (referred to also as wireless fidelity (Wi-Fi) (registered trademark), Bluetooth (registered trademark), or the like.

The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI) (registered trademark), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 15, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 15 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

An example of the vehicle control system to which the techniques according to the present disclosure are applied have been described. The techniques according to the present disclosure may be applied to, among the above-described configurations, for example, the imaging sections 7910, 7912, 7914, 7916, and 7918, outside-vehicle information detecting sections 7920, 7922, 7924, 7926, 7928, and 7930, a driver state detecting section 7510, and the like. Then, application of the techniques according to the present disclosure enables implementation of excellent correction processing for the in-plane delay skew in the light receiving apparatus, thus allowing construction of a vehicle control system with high-speed response. More specifically, application of the techniques according to the present disclosure allows suppression of a variation in distance measurement result depending on the position of the pixel within the same plane, enabling accurate distance measurement. As a result, distance measurement errors in detection of an oncoming vehicle or a pedestrian are reduced, enabling safe vehicle traveling to be achieved.

<Configurations that can be Taken by Present Disclosure>

The present disclosure can also take the following configurations

<<A. Light Receiving Apparatus>>

[A-1]

A light receiving apparatus including:

- a light receiving section with a plurality of pixels arranged in a two-dimensional shape;
- a signal line connected to each of the pixels;
- a time measuring section connected to the signal line and measuring a time from a light emission instruction timing to a light reception timing;
- a histogram creating section creating a histogram of a measured value measured by the time measuring section;
- a storage section storing correction values corresponding to positions of the pixels in the light receiving section;
- a correction processing section executing correction processing on the histogram created by the histogram creating section, on the basis of the correction values stored in the storage section; and
- an output section outputting a signal subjected to the correction processing by the correction processing section.

[A-2]

The light receiving apparatus according to [A-1] described above, in which each of the correction values includes a value based on a distance from a corresponding one of the pixels to the time measuring section.

[A-3]

The light receiving apparatus according to [A-2] described above, in which, on the basis of the correction value for the pixel at an end in the light receiving section, the correction values for the other pixels are calculated by linear interpolation.

[A-4]

The light receiving apparatus according to any one of [A-1] to [A-3] described above, in which a plurality of the histogram creating sections is provided corresponding to pixel rows in the light receiving section, and the correction processing section executes correction processing on each of histograms created by each of the plurality of the histogram creating sections.

[A-5]

The light receiving apparatus according to [A-4]described above, in which the correction processing section executes correction processing in units of bins in the histogram.

[A-6]

The light receiving apparatus according to [A-4] or [A-5] described above, in which the correction processing section executes correction processing using a system correction value common to all the histograms created by the plurality of the respective histogram creating sections.

[A-7]

The light receiving apparatus according to [A-6] described above, in which the system correction value includes a value corresponding to a delay common to all the histograms created by the plurality of the respective histogram creating sections.

[A-8]

The light receiving apparatus according to any one of [A-1] to [A-7] described above, in which the storage section includes a group of correction registers in which the correction value is set for each histogram.

[A-9]

The light receiving apparatus according to [A-8] described above, in which the correction processing section is provided in a later stage of the histogram creating sections and executes correction processing by adding the correction value to a bin value for the histogram created by each of the histogram creating sections.

[A-10]

The light receiving apparatus according to [A-8] described above, in which the correction processing section is provided in a former stage of the histogram creating sections and executes correction processing by adding the correction value to each of the measured values measured by the time measuring section.

[A-11]

The light receiving apparatus according to any one of [A-1] to [A-10] described above, in which a light receiving element in each of the pixels includes an element generating a signal in response to reception of photons.

[A-12]

The light receiving apparatus according to any one of [A-1] to [A-11], in which the light receiving section includes a pixel group in units of the plurality of pixels, the signal line includes a signal line group in units of a plurality of the signal lines, and the plurality of pixels included in the pixel group is connected to the plurality of the signal lines included in the signal line group, on a one-to-one basis.

<<B. Distance Measuring Apparatus>>

[B-1]

A distance measuring apparatus including:

a light source irradiating a measurement target with light; and a light receiving apparatus receiving light reflected by the measurement target, the light receiving apparatus including a light receiving section with a plurality of pixels arranged in a two-dimensional shape, a signal line connected to each of the pixels, a time measuring section connected to the signal line and measuring a time from a light emission instruction timing to a light reception timing, a histogram creating section creating a histogram of a measured value measured by the time measuring section, a storage section storing correction values corresponding to positions of the pixels in the light receiving section, a correction processing section executing correction processing on the histogram created by the histogram creating section, on the basis of the correction values stored in the storage section, and an output section outputting a signal subjected to the correction processing by the correction processing section.

[B-2]

The distance measuring apparatus according to [B-1] described above, in which each of the correction values includes a value based on a distance from a corresponding one of the pixels to the time measuring section.

[B-3]

The distance measuring apparatus according to [B-2] described above, in which, on the basis of the correction value for the pixel at an end in the light receiving section, the correction values for the other pixels are calculated by linear interpolation.

[B-4]

The distance measuring apparatus according to any one of [B-1] to [B-3] described above, in which a plurality of the histogram creating sections is provided corresponding to pixel rows in the light receiving section, and the correction processing section executes correction processing on each of histograms created by each of the plurality of the histogram creating sections.

[B-5]

The distance measuring apparatus according to [B-4] described above, in which the correction processing section executes correction processing in units of bins in the histogram.

[B-6]

The distance measuring apparatus according to [B-4] or [B-5] described above, in which the correction processing section executes correction processing using a system correction value common to all the histograms created by the plurality of the respective histogram creating sections.

[B-7]

The distance measuring apparatus according to [B-6] described above, in which the system correction value includes a value corresponding to a delay common to all the histograms created by the plurality of the respective histogram creating sections.

[B-8]

The distance measuring apparatus according to any one of [B-1] to [B-7] described above, in which the storage section includes a group of correction registers in which the correction value is set for each histogram.

[B-9]

The distance measuring apparatus according to [B-8] described above, in which the correction processing section is provided in a later stage of the histogram creating sections and executes correction processing by adding the correction value to a bin value for the histogram created by each of the histogram creating sections.

[B-10]

The distance measuring apparatus according to [B-8] described above, in which the correction processing section is provided in a former stage of the histogram creating sections and executes correction processing by adding the correction value to each of the measured values measured by the time measuring section.

[B-11]

The distance measuring apparatus according to any one of [B-1] to [B-10] described above, in which a light receiving element in each of the pixels includes an element generating a signal in response to reception of photons.

[B-12]

The distance measuring apparatus according to any one of [B-1] to [B-11], in which the light receiving section includes a pixel group in units of the plurality of pixels,
- the signal line includes a signal line group in units of a plurality of the signal lines, and
- the plurality of pixels included in the pixel group is connected to the plurality of the signal lines included in the signal line group, on a one-to-one basis.

REFERENCE SIGNS LIST

1 . . . Distance measuring apparatus, 10 . . . Subject (measurement target), 20 . . . Light source, 21 . . . Laser driver, 22 . . . Laser light source, 23 . . . Diffusing lens, 30 . . . Light receiving apparatus, 31 . . . Light receiving lens, 32 . . . Optical sensor, 33 . . . Circuit section, . . . Control section, 50 . . . Pixel, 51 . . . SPAD element, 60 . . . Light receiving section, 61 . . . Signal line, 70 . . . Distance measurement control section, 71 . . . Multiplexer (MUP), 72 ($72_0$ to $72_{n-1}$) . . . Time measuring section (TDC), 73 ($73_0$ to $73_{n-1}$) . . . Histogram creating section, 74 . . . Output section, 75 . . . In-plane delay correcting section, 80 . . . Application processor, 752 . . . Storage section, 754 . . . Adder

The invention claimed is:

1. A light receiving apparatus comprising:
   a light receiving circuit including a plurality of pixels arranged in pixel rows and pixel columns;
   a plurality of signal lines connected to the plurality of pixels in respective pixel rows;
   a plurality of time measuring circuits connected to corresponding signal lines and configured to measure a time from a light emission instruction timing to a light reception timing;
   a plurality of histogram creating circuits each configured to create a respective histogram of a measured value measured by a respective time measuring circuit and a frequency of the measured value, wherein each respective histogram creating circuit corresponds to a respective pixel row of the plurality of pixels;
   a memory configured to store correction values corresponding to the respective pixel rows;
   a correction processing circuit executing configured to execute correction processing on a sequentially selected histogram in units of bins of the sequentially selected histogram, wherein the correction processing includes adding a sequentially selected correction value to a bin value for the sequentially selected histogram or to the measured value for the sequentially selected histogram; and
   an output circuit configured to output a signal subjected to the correction processing by the correction processing circuit.

2. The light receiving apparatus according to claim 1, wherein
   each correction values includes a value based on a distance from a corresponding pixel to the time measuring circuit.

3. The light receiving apparatus according to claim 2, wherein,
   on a basis of a correction value corresponding to a pixel at an end in the light receiving circuit, correction values for the other pixels are calculated by linear interpolation.

4. The light receiving apparatus according to claim 1, wherein
   the correction processing circuit executes correction processing using a system correction value common to all histograms created by the plurality of histogram creating circuits.

5. The light receiving apparatus according to claim 4, wherein
   the system correction value includes a value corresponding to a delay common to all the histograms created by the plurality of the respective-histogram creating circuits.

6. The light receiving apparatus according to claim 1, wherein
   the memory includes a group of correction registers in which correction values are set for each of the plurality of histograms.

7. The light receiving apparatus according to claim 6, wherein
   the correction processing circuit is provided in a later stage of the plurality of histogram creating circuits and executes correction processing by adding the respective correction value to the bin value for the sequentially selected histogram.

8. The light receiving apparatus according to claim 6, wherein
   the correction processing section is provided in a former stage of the plurality of histogram creating circuits and executes correction processing by adding the sequentially selected correction value to each measured value of the sequentially selected histogram.

9. The light receiving apparatus according to claim 1, wherein
   a light receiving element in each of the plurality of pixels includes an element generating a signal in response to reception of photons.

10. The light receiving apparatus according to claim 1, wherein
    the pixels are organized into pixel groups,
    the signal lines are organized into signal line groups, and
    the pixel groups are connected to the plurality of the signal line groups on a one-to-one basis.

11. A distance measuring apparatus comprising:
    a light source irradiating a measurement target with light; and a light receiving apparatus receiving light reflected by the measurement target, the light receiving apparatus including
a light receiving circuit including a plurality of pixels arranged pixel rows and pixel columns,
a plurality of signal lines connected to the plurality of pixels in respective pixel rows,
a plurality of time measuring circuits connected to the corresponding signal lines and configured to measure a time from a light emission instruction timing to a light reception timing,
a plurality of histogram creating circuits each configured to create a respective histogram of a measured value measured by a respective time measuring circuit and a frequency of the measured value, wherein each respective histogram creating circuit corresponds to a respective pixel row of the plurality of pixels,
a memory configured to store correction values corresponding to the respective pixel rows,
a correction processing circuit configured to execute correction processing on a sequentially selected histogram, wherein the correction processing includes adding a sequentially selected correction value to a bin value for the sequentially selected histogram or to the measured value for the sequentially selected histogram, and
an output circuit configured to output outputting a signal subjected to the correction processing by the correction processing section.

12. The distance measuring apparatus according to claim 11, wherein
each correction value includes a value based on a distance from a corresponding pixel to the time measuring circuit.

13. The distance measuring apparatus according to claim 12, wherein,
on a basis of a correction value corresponding to a pixel at an end in the light receiving circuit, correction values for the other pixels are calculated by linear interpolation.

14. The distance measuring apparatus according to claim 11, wherein
the correction processing circuit executes correction processing using a system correction value common to all histograms created by the plurality of histogram creating circuits.

15. The distance measuring apparatus according to claim 14, wherein
the system correction value includes a value corresponding to a delay common to all histograms created by the plurality of histogram creating circuits.

16. The distance measuring apparatus according to claim 11, wherein
the memory includes a group of correction registers in which correction values are set for each of the plurality of histograms.

17. The distance measuring apparatus according to claim 16, wherein
the correction processing circuit is provided in a later stage of the plurality of histogram creating circuits and executes correction processing by adding the respective correction value to the bin value for the sequentially selected histogram.

18. The distance measuring apparatus according to claim 16, wherein
the correction processing section is provided in a former stage of the plurality of histogram creating circuits and executes correction processing by adding the sequentially selected correction value to each measured value of the sequentially selected histogram.

19. The distance measuring apparatus according to claim 11, wherein
a light receiving element in each of the plurality of pixels includes an element generating a signal in response to reception of photons.

20. The distance measuring apparatus according to claim 11, wherein
the pixels are organized into pixel groups,
the signal lines are organized into signal line groups, and
the pixel groups are connected to the signal line groups on a one-to-one basis.

* * * * *